United States Patent [19]
Itoh et al.

[11] Patent Number: 5,132,816
[45] Date of Patent: Jul. 21, 1992

[54] FERROELECTRIC LIQUID CRYSTAL DEVICE AND METHOD OF MANUFACTURING THE SAME

[75] Inventors: Nobuyuki Itoh; Tokihiko Shinomiya, both of Nara, Japan

[73] Assignee: Sharp Kabushiki Kaisha, Osaka, Japan

[21] Appl. No.: 472,858

[22] Filed: Jan. 31, 1990

[30] Foreign Application Priority Data

Feb. 2, 1989 [JP] Japan .................... 1-25445
Dec. 15, 1989 [JP] Japan .................... 1-326457

[51] Int. Cl.$^5$ .............................................. G02F 1/13
[52] U.S. Cl. ............................... 359/56; 359/67; 359/79; 359/75; 340/765
[58] Field of Search ............... 350/339 R, 350 S, 333, 350/341, 336; 340/765, 784; 359/56, 67, 79

[56] References Cited

U.S. PATENT DOCUMENTS

| 4,286,266 | 8/1981 | De Zwart et al. | 350/339 R |
| 4,448,491 | 5/1984 | Okubo | 350/339 R |
| 4,720,173 | 1/1988 | Okada et al. | 350/361 |
| 4,728,176 | 3/1988 | Tsuboyama et al. | 350/350 S |
| 4,733,948 | 5/1988 | Kitahara | 350/339 F |
| 4,744,639 | 5/1988 | Tsuboyama | 350/350 S |
| 4,802,743 | 2/1989 | Takao et al. | 350/350 S |
| 4,805,995 | 2/1989 | Tarigoe | 350/339 R |

FOREIGN PATENT DOCUMENTS

| 20228557 | 11/1986 | European Pat. Off. . |
| 20271313 | 8/1987 | European Pat. Off. . |
| 0324433 | 1/1989 | European Pat. Off. . |
| 10324433 | 1/1989 | European Pat. Off. . |
| 0186227 | 9/1985 | Japan .............. 350/350 S |
| 62-160424 | 12/1987 | Japan . |

Primary Examiner—Rolf Hille
Assistant Examiner—Tan Ho

[57] ABSTRACT

A ferroelectric liquid crystal device (81) has transparent plates (83a, 83b), on which transparent electrodes (85a, 85b) are formed, arranged opposed to each other to form a space therebetween, with ferroelectric liquid crystals (95) sealed in the space. Black masks (89b) are arranged between the transparent electrodes (85b). Portions of the black masks (89b) extend over the transparent electrodes (85b). Black masks (89a) are arranged between the transparent electrodes (85a), with portions of the black masks (89a) extending over the transparent electrodes (85a). Since black masks (89a, 89b) are provided between the transparent electrodes (85a, 85b), respectively, state of display can be made uniform in non-pixel portions. Since the black masks (89a, 89b) on the transparent electrodes (85a, 85b) prevents undesired inversion of spontaneous polarization of the liquid crystal molecules in the pixel portions, the state of display of the pixel portions can be made stable.

18 Claims, 18 Drawing Sheets

FERROELECTRIC LIQUID CRYSTAL DEVICE AND METHOD OF MANUFACTURING THE SAME

BACKGROUND OF THE INVENTION

1. Field of the Invention

The present invention relates to a ferroelectric liquid crystal device and, more specifically, to structures of pixel portions and non-pixel portions. The present invention further relates to a method of manufacturing such a ferroelectric liquid crystal device.

2. Description of the Background Art

FIG. 23 is a perspective view showing schematically a conventional ferroelectric liquid crystal device. Transparent electrodes 3a are arranged spaced apart from each other on a main surface of a transparent plate 2a. Transparent electrodes 3b are arranged spaced apart from each other on a main surface of a transparent plate 2b. The transparent plates 2a and 2b are positioned opposing to each other to form a space. The transparent electrodes 3a and the transparent electrodes 3b intersect with each other in three dimensions. Areas at which the transparent electrodes 3a and 3b intersect with each other constitute pixels portions. The remaining portions are the non-pixel portions. Display patterns are formed by combining the pixel portions. Ferroelectric liquid crystals are sealed
in the space formed by the transparent plates 2a and 2b The ferroelectric liquid crystals are not shown in FIG. 23.

The conventional ferroelectric liquid crystal device 1 will be further described with reference to FIGS. 24 and 25. FIG. 24 is a cross sectional view taken in a direction of an arrow XXIV of FIG. 23. FIG. 25 is a cross sectional view taken in a direction of an arrow XXV of FIG. 24.

As shown in FIG. 24, the ferroelectric liquid crystal device 1 has a structure wherein liquid crystal molecules 6 are sandwiched by the transparent plate 2a, on which transparent electrodes 3a are formed, and a transparent plate 2b, on which transparent electrodes 3b are formed. The portion represented by 7a shows that the left end portion of the liquid crystal molecule 6 is projected upward from the surface of the sheet. The portion represented by 7b shows that the right end portion of the liquid crystal molecule 6 is projected upward from the surface of the sheet. The reference character 8 indicates spontaneous polarization of the liquid crystal molecule 6. The head of the arrow corresponds to the positive polarity, while the tail of the arrow corresponds to the negative polarity. The reference character 9 shows a line indicating a boundary between a layer of the liquid crystal molecule 6 and a layer of the liquid crystal molecule 6. The line represented by 9 will be hereinafter called as a boundary.

An insulating film 4a is formed on the transparent electrode 3a. An alignment film 5a is formed on the insulating film 4a. An insulating film 4b is formed on the transparent electrode 3b. An alignment film 5b is formed on the insulating film 4b. The insulating films 4a, 4b and alignment films 5a and 5b are not shown in FIG. 23.

The alignment films 5a and 5b serve to make the orientation of the liquid crystal molecules 6 parallel to the main surface of the transparent plates 2a and 2b. However, the boundaries 9 are not always made parallel to each other dependent on the alignment films 5a and 5b. Rubbing is done on the transparent plates 2a and 2b, so that the boundaries 9 are made parallel to each other.

FIG. 26 shows rubbing on the transparent plate 2a on which the alignment film is formed. A rubbing cloth 11 is attached around a rubbing roller 12. The rubbing roller 12 is rotated in the direction of the arrow, and the transparent plate 2a is fed in contact with the rubbing cloth 11. Consequently, a plurality of linear grooves are formed on the transparent plate 2a. These grooves are called rubbings. The boundaries 9 are aligned with these grooves. The intensity of polarity of the alignment film is considered to be changed by the rubbings. Rubbing is also done on the transparent plate 2b on which the alignment film is formed.

The ferroelectric liquid crystal device has the following characteristics. Namely, bistability, memory effect and high responsiveness. Bistability will be described at first.

As shown in FIG. 25, the liquid crystal molecule 6 is stable when the longitudinal axis thereof is inclined by $\theta$ from the normal 10 of the boundary 9 and when it is inclined by $-\theta$. Namely, the liquid crystal molecule 6 is in a bistable state.

How the liquid crystal molecule 6 is set in a bistable state will be described with reference to FIGS. 24, 25, 27 and 28. In FIG. 27, only the orientation of the liquid crystal molecules 6 is different from that in the ferroelectric liquid crystal device 1 shown in FIG. 24. FIG. 28 is a cross sectional view taken along the direction of an arrow XXVIII of FIG. 27. As shown in FIGS. 27 and 28, if the polarity of the alignment film 5a is different from that of the alignment film 5b, for example if the polarity of the alignment film 5a is negative and that of the alignment film 5b is positive, the liquid crystal molecules 6 will be as shown in FIGS. 27 and 28. This is because the liquid crystal molecules 6 have spontaneous polarization 8. As shown in FIG. 28, the liquid crystal molecules 6 are stable with the longitudinal axes being inclined by $\theta$ from the normal 10. When a positive voltage is applied to the transparent electrode 3a and a negative voltage is applied to the transparent electrode 3b, the direction of the spontaneous polarization 8 of those liquid crystal molecules 6 positioned between the transparent electrodes 3a and 3b is inverted as shown in FIG. 24. Referring to FIG. 25, the liquid crystal molecules 6 on the transparent electrode 3b have their longitudinal axes inclined by $-\theta$ from the normal 10. However, when the application of the voltages is stopped, the state shown in FIGS. 27 and 28 are regained. The reason for this is that the alignment film 5a has negative polarity and the alignment film 5b has positive polarity. Therefore, the liquid crystal molecules 6 are not stable when the longitudinal axes are inclined by $-\theta$ from the normal 10. In that case, the bistable state is not realized.

If the polarity of the alignment film 5a and the polarity of the alignment film 5b are made the same and the intensities of the polarity are made approximately the same, then stable state as shown in FIG. 24 and 25 is realized even when a positive voltage is applied to the transparent electrode 3a and a negative voltages is applied to the transparent electrode 3b. Thereafter, the application of voltages is stopped, as shown in FIGS. 24 and 25. In that case, even if the polarities of the alignment film 5a and of the alignment film 5b are the same, the liquid crystal molecules 6 are influenced by the stronger polarity after the application of voltages is stopped, when the intensity of polarity is different.

Then, a negative voltage is applied to the transparent electrode 3a shown in FIG. 24 and a positive voltage is applied to the transparent electrode 3b. Then the liquid crystal molecules 6 will be at the state shown in FIGS. 27 and 28. Even when the application of voltages is stopped, the state of the liquid crystal molecules 6 shown in FIGS. 27 and 28 is maintained.

Namely, the bistable state of the liquid crystal molecules 6 can be realized by making the polarity of the alignment film 5a the same as that of the alignment film 5b and by making the intensities of polarities approximately equal to each other.

The ferroelectric liquid crystal device 1 has memory effect, since the orientation of the liquid crystal molecules 6 is maintained even after the application of voltages is stopped. In addition, since the liquid crystal molecule 6 has both positive and negative polarities called spontaneous polarization, the orientation of the liquid crystal molecule 6 is immediately changed when the voltage is applied thereto. Namely, the ferroelectric liquid crystal device 1 has high responsiveness.

The operation of the ferroelectric liquid crystal device 1 will be described with reference to FIGS. 24, 25, 27 and 28.

Referring to FIG. 24, when a positive voltage is applied to the transparent electrode 3a and a negative voltage is applied to the transparent electrode 3b, the liquid crystal molecules 6 are arranged as shown in FIGS. 24 and 25.

Thereafter, at the state of FIGS. 24 and 25, a negative voltage is applied to the transparent electrode 3a and a positive voltage is applied to the transparent electrode 3b. Then, orientation of those liquid crystal molecules 6 which are positioned between the transparent electrode 3a and the transparent electrode 3b is changed as shown In FIGS. 27 and 28. The liquid crystal molecules 6 positioned on the non-electrode portion 18 are not influenced by the voltages, so that the orientation thereof is not changed.

A deflecter transmitting light only in the direction shown by the arrow D of FIG. 25 is attached to the transparent plate 2a shown in FIG. 24, and a deflecter transmitting light only in the direction shown by the arrow E of FIG. 25 is attached below the transparent plate 2b. When light is projected from above, an area where the transparent electrode 3a intersect with the transparent electrode 3b in three dimensions is set to a dark state, while an area where the non-electrode portion 18 is positioned is set to a bright state. The reason for this will be described with reference to FIG. 25. Since the angle of light deflected in the direction D is the same as the angle of the liquid crystal molecules 6 between the transparent electrodes 3a and 3b, the light directly passes through the liquid crystal molecules 6. The light deflected in the direction D cannot pass through the deflector transmitting light only in the E direction, so that the area where the transparent electrodes 3a and 3b intersect three dimensionally is set to a dark state. Meanwhile, the angle of light deflected in the direction D is different from the angle of the liquid crystal molecules 6 positioned on the non-electrode portion 18. Therefore, the light is elliptically deflected when it passes through the liquid crystal molecules 6. Part of the elliptically deflected light passes through the deflector transmitting light only in the direction E, so that the non-electrode portion 18 is set to the bright state.

A method of driving the ferroelectric liquid crystal device 1 will be described in the following. FIG. 29 is a partial plan view showing pixel portions and non-pixel portions of the ferroelectric liquid crystal device. Electrodes 19a and 19b correspond to the transparent electrodes 3a shown in FIG. 23, while electrodes 21a and 21b correspond to transparent electrodes 3b shown in FIG. 23. Areas where the electrodes 19a, 19b and 21a and 21b intersect with each other are the pixel portions 23a, 23b, 23c and 23d, respectively. The remaining areas are the non-pixel portions 25.

A pulse such as shown by 27a of FIG. 30 is applied to the electrode 19a. A pulse such as shown by 27b of FIG. 30 is applied to the electrode 19b. A pulse such as shown by 27c of FIG. 30 is applied to the electrode 21a. Then, a voltage having the pulse of 27d, that is, the voltage of the pulse 27a minus the voltage of the pulse 27c, is applied to the pixel portion 23a, as shown in FIG. 30. The pulse 27d exceeds the threshold value 29. Therefore, the orientation of the liquid crystal molecules arranged in the pixel portion 23a is changed.

A voltage of the pulse 27e, that is, the voltage of the pulse 27b minus the voltage of the pulse 27c, is applied to the pixel portion 23b. The pulse 27e does not exceed the threshold value 29. Therefore, the liquid crystal molecules in the pixel portion 23b are kept as they are.

As shown in FIG. 30, the pulse 27d applied to the pixel portion 23a does not always exceed the threshold value. Such a driving method is called multiplexing driving.

The conventional ferroelectric liquid crystal device has the following two drawbacks. The first of these will be described with reference to FIGS. 31, 32 and 33. FIG. 31 is a vertical sectional view of a conventional ferroelectric liquid crystal device. FIG. 32 is a cross section of the ferroelectric liquid crystal device shown in FIG. 31 taken from the direction of the arrow XXXII. FIG. 33 is a partial plan view of the display surface of the ferroelectric liquid crystal device shown in FIG. 31. The reference characters in FIGS. 31 and 32 denote the same portions denoted by the same reference characters of FIGS. 24 and 25.

As shown in FIG. 31, the distance between the alignment films 5a and 5b positioned on the non-electrode portion 18 (portion where there is no electrode) is longer than that between the alignment films 5a and 5b on the transparent electrodes 3a and 3b, since the transparent electrodes 3a and 3b are not formed on the non-electrode portion 18. Therefore, the difference of intensity of the polarities between the alignment films 5a and 5b positioned on the non-electrode portion 18 is further reduced from the difference of intensity of polarities between the alignment films 5a and 5b on the transparent electrodes 3a and 3b. Consequently, as shown in FIGS. 31 and 32, when liquid crystal is sealed, liquid crystal molecules 6 inclined by $\theta$ from the normal 10 and the molecules inclined by $-\theta$ from the normal 10 may possibly be mixed on the non-electrode portion 18.

When such a ferroelectric liquid crystal device is used, there are portions 35a transmitting light and portions 35b not transmitting light are mixed on the non-pixel portion 31 which is the non-electrode portion, as shown in FIGS. 33. Since there are portions 35a transmitting light and portions 35b not transmitting light mixed, the state of display on the non-pixel portion 31 will be uneven. The reference characters 33 represents pixel portions.

The second drawback of the conventional ferroelectric liquid crystal device will be described with reference to FIGS. 34, 35 and 36. The same reference characters in FIGS. 34 and 35 represent the same portions as represented in FIG. 29.

Referring to FIG. 34, the liquid crystal molecules in the pixel portions 23a and 23c are of the same orientation as the liquid crystal molecules 6 on the non-electrode portion 18 shown in FIG. 25. The liquid crystal molecules in the pixel portions 23b and 23d are of the same orientation as the liquid crystal molecules 6 on the electrode portion 3b shown in FIG. 25. Even if the voltage applied to the pixel portions 23a, 23b, 23c and 23d does not exceed the threshold value, regions 37 in which spontaneous polarization of the liquid crystal molecules is inverted are generated after a time lapse of a prescribed period, as shown in FIG. 35. The reason for this may be the fact that the pulse 27d or the pulse 27e shown in FIG. 30 is always applied to the pixel portions 23a, 23b, 23c and 23d.

Inversion of the spontaneous polarization of the liquid crystal molecules spreads in the direction shown by the arrow A in FIG. 35. The reason will be described. FIG. 36 is a perspective view showing arrangement of liquid crystal layers in the pixel portion 23a. As shown in FIG. 36, a large number of liquid crystal layers 39 having lateral "V" shape are arranged in the pixel portion 23a. The liquid crystal layers 39 are arranged in the same direction. Since inversion of the spontaneous polarization starts from the liquid crystal molecule in the liquid crystal layer 39 near the side shown by the letter B, the inversion of the spontaneous polarization proceeds from B to C. The direction from B to C is the same as the direction shown by the arrow A in FIG. 35.

A ferroelectric liquid crystal device in which the state of display of the pixel portions can be made stable is disclosed in Japanese Patent Laying-Open No. 1-179915. The ferroelectric liquid crystal device shown in the Patent Laying-Open No. 1-179915 will be described with reference to FIGS. 37, 38, 39 and 40.

As shown in FIG. 37, a plurality of electrodes 43 are arranged spaced apart from each other on a main surface of a plate 41. A molybdenum film 45 is formed on one side edge of each of the electrode 43. Two of such plates 41 are prepared for manufacturing the ferroelectric liquid crystal device.

FIGS. 39 and 40 are plan views of a plate used for manufacturing the ferroelectric liquid crystal device. As shown in FIG. 39, electrodes 43a are arranged spaced apart from each other on the main surface of the plate 41a. Molybdenum films 45a are formed on one side edge of each of the electrodes 43a. As shown in FIG. 40, electrodes 43b are arranged spaced apart from each other on the plate 41b. The direction of extension of the electrode 43b is orthogonal to the direction of extension of the electrode 43a shown in FIG. 39. Molybdenum films 45b are formed on one side edge of the electrodes 43b. The plate 41b shown in FIG. 40 is arranged to be opposed to the plate 41a shown in FIG. 39. The edge portion represented by G of the plate 41b faces the edge portion represented by D of the plate 41a, while the edge portion represented by F of the plate 41b faces the edge portion represented by E of the plate 41a. FIG. 38 is a plan view of a pixel portion of the ferroelectric liquid crystal device. The region represented by B in FIG. 36 is on the right side of the pixel 47, and the region C of FIG. 36 is on the left side of the pixel portion 47. Therefore, recess of the lateral "V" shape of the liquid crystal layer 39 shown in FIG. 36 faces the side of the molybdenum film 45b.

If the pixel portion 47 is structured in this manner, the liquid crystal molecules in the pixel portion 47 is not inverted unless the voltage applied to the pixel portion 47 exceeds the threshold value. The reason for this may be the fact that there is a molybdenum film 45b on the side B where the liquid crystal molecules tend to be inverted.

However, the unevenness of display of the non-pixel portion, which was the first drawback, could not be eliminated by the ferroelectric liquid crystal device disclosed in Japanese Patent Laying-Open No. 1-179915.

In addition, as shown in FIG. 37, the distance between the electrodes 43 is small, so that there is a possibility of short circuit between electrodes 43, as the molybdenum film 45 may possibly be in contact with the adjacent electrode 43.

The present invention was made to solve the above described problem of the prior art.

SUMMARY OF THE INVENTION

An object of the present invention is to provide a ferroelectric liquid crystal device having a structure capable of making uniform display state of non-pixel portions.

Another object of the present invention is to provide a method of manufacturing a ferroelectric liquid crystal device having a structure capable of making uniform display state of non-pixel portions.

A further object of the present invention is to provide a ferroelectric liquid crystal device having a structure capable of making stable display state of pixel portions.

A still further object of the present invention is to provide a method of manufacturing a ferroelectric liquid crystal device having a structure capable of making stable display state of pixel portions.

A still further object of the present invention is to provide a ferroelectric liquid crystal device having a structure capable of making display state of pixel portions stable and making display state of non-pixel portions uniform.

The present invention relates to a ferroelectric liquid crystal device in which ferroelectric liquid crystals is sealed between first and second plates arranged opposing to each other to form a space.

In accordance with a first aspect of the present invention, the liquid crystal device comprises a second electrode portion, a plurality of first electrode portion and a light controlling device.

The second electrode portion is arranged on a surface of the second plate facing the first plate. The first electrode portions are arranged spaced from each other on the surface of the first plate facing the second plate. The light controlling device is provided between adjacent ones of the first electrode portions. The light controlling means controls transmittance of light.

In accordance with a second aspect of the present invention, the liquid crystal device comprises a second electrode portion, a plurality of first electrode portions, first filling members of an electric insulating material, and a first and second alignment films.

The second electrode portion is formed on a surface of the second plate facing the first plate. The second alignment film is formed on the second electrode portion. The first electrode portions are arranged spaced from each other on the surface of the first plate facing the second plate. The first filling member is are positioned between adjacent ones of the first electrode portions. The thickness of the first filling member are larger than that of the first electrode portions. The first alignment film is formed on the first electrode portions and on the first filling member. The distance between the first alignment film positioned on the first filling member and the second alignment film is smaller than the distance between the first alignment film positioned on the first electrode portions and the second alignment film.

The third aspect of the present invention is a method of manufacturing the ferroelectric liquid crystal device in accordance with the second aspect. First, a plurality of first electrode portions are formed spaced apart from each other on a first plate. Then, photosensitive filling member is formed to be thicker than the first electrode portion in the spaces between the adjacent ones of the first electrode portions and on the first electrode portions. Then, the photosensitive filling member is exposed so that the photosensitive filling member in the spaces between the first electrodes is hardened. Thereafter, photosensitive filling member on the first electrode portions is removed. Then, a first alignment film is formed on the first electrode portions and on the photosensitive filling member. Then, a second alignment film is formed on the second electrode portion formed on a second plate. Thereafter, the first plate and the second plate are arranged opposed to each other so that there is a space between the first alignment film and the second alignment film. Then, ferroelectric liquid crystals are sealed in the space.

In the fourth aspect of the present invention, the liquid crystal device comprises a second electrode portion, a plurality of first electrode portions and an inversion preventing member.

The second electrode portion is arranged on a surface of a second plate facing a first plate. The first electrode portions are arranged spaced from each other on the surface of the first plate facing the second plate. The inversion preventing member prevents undesired inversion of spontaneous polarization of the ferroelectric liquid crystal molecules. The inversion preventing member is provided on the outside edge of a region where the first electrode portion and the second electrode portion overlap with each other on the main surface of the first or second electrode portion. The inversion preventing member is provided on the side of the outside edge where inversion of spontaneous polarization tends to occur.

The fifth aspect of the present invention is a method of manufacturing the ferroelectric liquid crystal device in accordance with the fourth aspect. First, a plurality of first electrode portions are formed spaced apart from each other on a surface of a first plate. Then, the inversion preventing member is formed on one side edge of the first electrode portion on the main surface of the first electrode portion. The inversion preventing member prevents undesired inversion of spontaneous polarization of the ferroelectric liquid crystal molecules. Then, a plurality of second electrode portions are formed spaced apart from each other on a surface of a second plate. Thereafter, the inversion preventing member is formed on one and the other side edges of the second electrode portion on the main surface of the second electrode portion. Then, the first plate and the second plate are arranged opposed to each other such that the first electrode portions intersect the second electrode portions in three dimensions and a space is formed therebetween. On this occasion, the inversion preventing member on the main surface of the first electrode portion is adapted to be on the side where inversion of spontaneous polarization tends to occur. Thereafter, the ferroelectric liquid crystals are sealed in the space.

In the first aspect of the present invention, the light controlling device is provided between adjacent first electrode portions. The light controlling device controls transmittance of light, so that the display state can be made uniform at the non-pixel portion position between the first electrode portions.

In the second aspect of the present invention, first filling member of an electric insulating material is positioned between adjacent ones of the first electrode portions. The thickness of the first filling member is larger than that of the first electrode portion. Therefore, the distance between the first alignment film formed on the first filling member and the second alignment film formed on the second electrode portion is shorter than the distance between the first alignment film formed on the first electrode portion and the second alignment film formed on the second electrode portion. Therefore, the difference of intensity of polarities of the first and second alignment films is large on the first filling member, which is the non-pixel portion, even if the difference between intensity of polarity of the first and second alignment films is small. Accordingly, the orientation of the liquid crystal molecules positioned at the non-pixel portions can be made uniform, so that the state of display can be made uniform in the non-pixel portions.

In the fourth aspect of the present invention, an inversion preventing member is provided. The inversion preventing member prevents undesired inversion of spontaneous polarization of the ferroelectric liquid crystal molecules. The inversion preventing member is provided on the outside edge of a region where the first electrode portion and the second electrode portion overlap with each other on the main surface of the first or second electrode portion. The inversion preventing member is provided on that portion of the outside edge where inversion of spontaneous polarization tends to occur. The inventors have proven by experiments that undesired inversion of spontaneous polarization of the liquid crystal molecules arranged in the pixel portions can be prevented by providing the inversion preventing member on such portion. Therefore, in the fourth aspect of the present invention, the display state of the pixel portions can be made stable.

In the fifth aspect of the present invention, the inversion preventing member is formed on one side edge of the first electrode portion on the main surface of the first electrode portion. The inversion preventing member is also formed on one and the other side edges of the second electrode portion on the main surface of the second electrode portion. Therefore, even if the alignment of the first and second plates is slightly deviated when the first and second plates are arranged opposed to each other, pixel portions can be formed without fail. Therefore, manufacturing of the device in accordance with the fourth aspect can be facilitated in accordance with the fifth aspect of the present invention.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 36 is a perspective view showing arrangement of liquid crystal layers in a pixel portion 23a;

DESCRIPTION OF THE PREFERRED EMBODIMENTS

Figure 1:
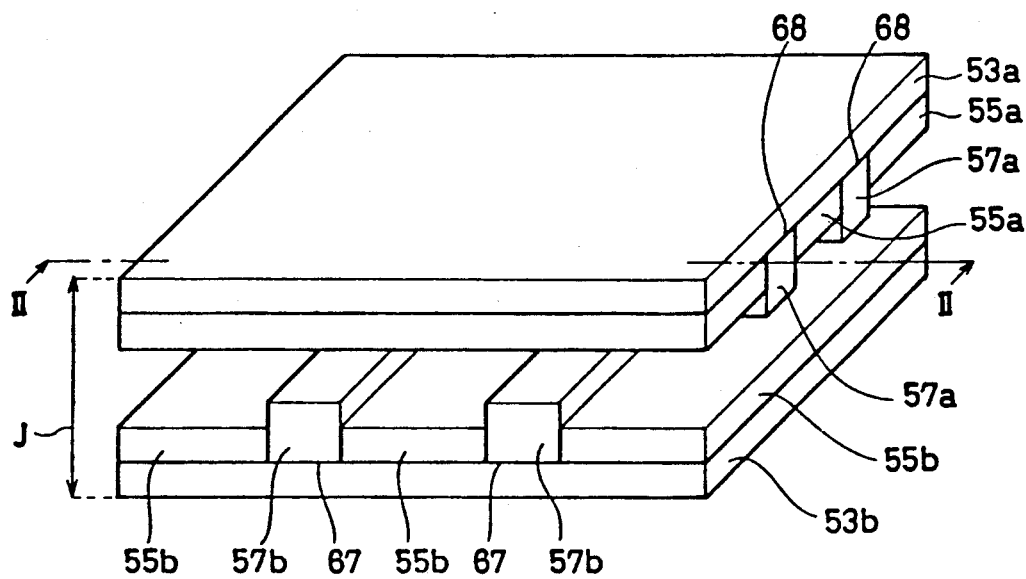
FIG. 1 is a perspective view schematically showing a first embodiment of the present invention.
Figure 2:
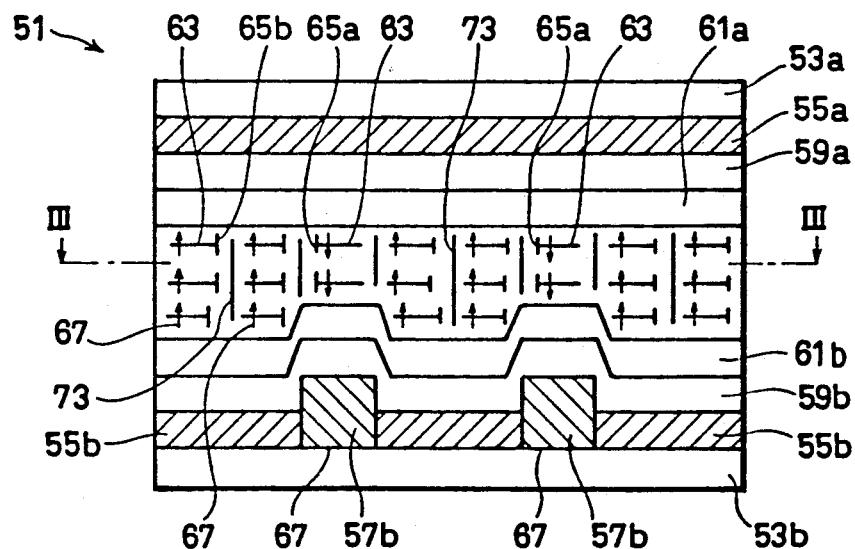
FIG. 2 is a cross sectional view taken along the direction of the arrow II of FIG. 1.
Figure 3:
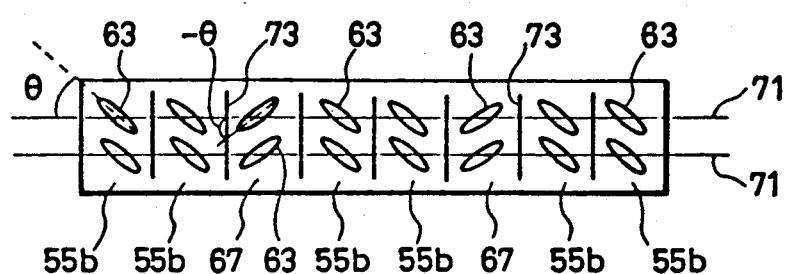
FIG. 3 is a cross sectional view taken along the direction of the arrow III of FIG. 2.

FIG. 1 is a perspective view schematically showing a first embodiment of the ferroelectric liquid crystal device in accordance with the present invention. FIG. 2 is a cross sectional view of the ferroelectric liquid crystal device 51 of FIG. 1 taken along the direction of the arrow II. FIG. 3 is a cross sectional view of the ferroelectric liquid crystal device 51 shown in FIG. 2 taken along the direction of the arrow III.

As shown in FIG. 1, the ferroelectric liquid crystal device 51 comprises transparent plates 53a and 53b, and transparent resin layers 57a and 57b. The transparent plates 53a and 53b are arranged opposed to each other. The transparent plates 53a and 53b are formed of glass. A plurality of transparent electrodes 55a are arranged spaced apart from each other on the main surface of the transparent plate 53a. A plurality of transparent electrodes 55b are arranged spaced apart from each other on the main surface of the transparent plate 53b. The transparent electrodes 55a and 55b are formed of NESA glass. The transparent electrodes 55a and 55b intersect with each other in three dimensions.

Transparent resin layers 57a are arranged between the transparent electrodes 55a. Transparent resin layers 57b are arranged between the transparent electrodes 55b. The transparent resin layers 57a and 57b are acrylic transparent resin. In the first embodiment, RFG-7 produced by SEKISUI Fine Chemical Corporation is used as the transparent resin layers 57a and 57b. Ferroelectric liquid crystals is sealed in a space formed by the transparent plates 53a and 53b. The ferroelectric liquid crystals are not shown in FIG. 1. The type of the ferroelectric liquid crystal is chiral smectic C.

The first embodiment of the ferroelectric liquid crystal device in accordance with the present invention will be further described with reference to FIG. 2. Transparent electrodes 55a are formed on the transparent plate 53a. An insulating film 59a is formed on the transparent electrode 55a. The insulating film 59a is formed of $SiO_2$. An alignment film 61a is formed on the insulating film 59a. The alignment film 61a is formed of Nylon-6.

A plurality of transparent electrodes 55b are arranged spaced apart from each other on the transparent plate 53b. Transparent resin layers 57b are formed on non-electrode portions 67 between the transparent electrodes 55b. The thickness of the transparent resin layers 57b is larger than that of the transparent electrodes 55b. An insulating film 59b of $SiO_2$ is formed on the transparent electrodes 55b. An alignment film 61b of Nylon-6 is formed on the insulating film 59b. Layers of liquid crystal molecules 63 are arranged between the alignment films 61a and 61b. The reference numeral 73 denotes a line indicating boundary between layers. The line 73 will be hereinafter referred to as a boundary. The portion represented by 65b indicates that the right end portion of the liquid crystal molecule 63 is projected upward from the surface of the sheet. The portion represented by 65a indicates that the left end portion of the liquid crystal molecule 63 is projected upward from the surface of the sheet. The reference numeral 67 represents spontaneous polarization of the liquid crystal molecule 63. The direction of the head of the arrow corresponds to the positive polarity, and the opposite direction corresponds to negative polarity.

As shown in FIG. 3, the liquid crystal molecules 63 positioned on the transparent electrodes 55b have their longitudinal axes inclined by $\theta$ from the normal 71 of the boundary 73. The liquid crystal molecules 63 on the non-electrode portions 67 have their longitudinal axes inclined by $-\theta$ from the normal 71.

In order to realize bistable state of the liquid crystal molecules 63, the difference of intensity of the polarities of the alignment films 61a and 61b is made small in the following manner. As to the transparent plate 53a on which the alignment film 61a is formed, a rubbing roller is brought into contact with the transparent plate 53a, and the rubbing roller is pressed onto the transparent plate 53a by 0.7 mm to carry out rubbing. As to the transparent plate 53b on which the alignment film 61b is formed, the rubbing roller is pressed to 1 mm. The difference between the intensity of polarities of the alignment films 61a and 61b was made the smallest when rubbing was carried out in this manner on the alignment films 61a and 61b.

A method of manufacturing the first embodiment of the ferroelectric liquid crystal device in accordance with the present invention will be described in the following with reference to FIGS. 4A to 4F.

Figure 4A:
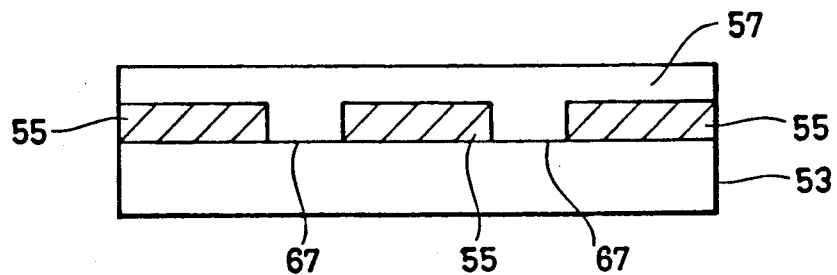
FIGS. 4A to 4F are cross sectional views showing, in this order, the method of forming transparent resin layer included in the first embodiment.

First, as shown in FIG. 4A, a photo hardening transparent resin is applied by using a spin coater on a transparent plate 53 on which the transparent electrodes 55 are arranged spaced from each other, to form the transparent resin layers 57. The thickness of the transparent electrodes 55 is 2000 Å. The thickness of the transparent resin layer 57 positioned on the transparent electrodes 55 is 2000 Å. The thickness of the transparent resin layer 57 positioned on the non-electrode portion 67 is 4000 Å. The transparent resin layer 57 is prebaked for 30 minutes at 90° C.

Figure 4B:
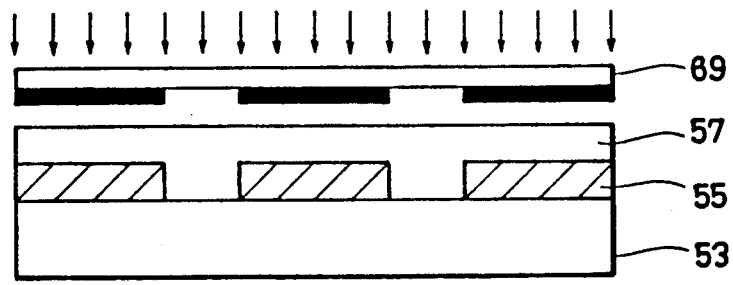
Figure 4C:
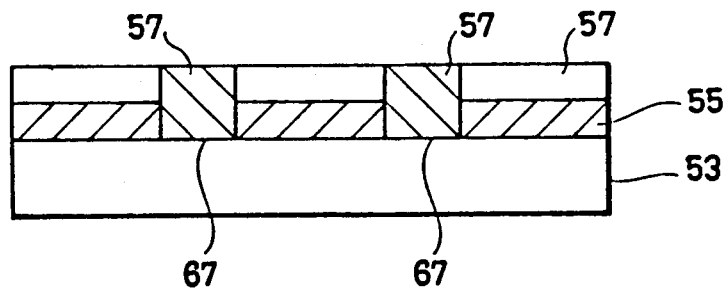

Thereafter, as shown in FIG. 4B, a photomask 69 is placed above the transparent resin layer 57, and the transparent resin layer 57 is exposed with a high pressure mercury lamp. The photomask 69 is structured such that the transparent resin layer 57 positioned on the transparent electrode 55 is not exposed to light. Therefore, as shown in FIG. 4C, only the portions of the transparent resin layer 57 positioned on the non-electrode portions 67 are hardened by light.

Figure 4D:
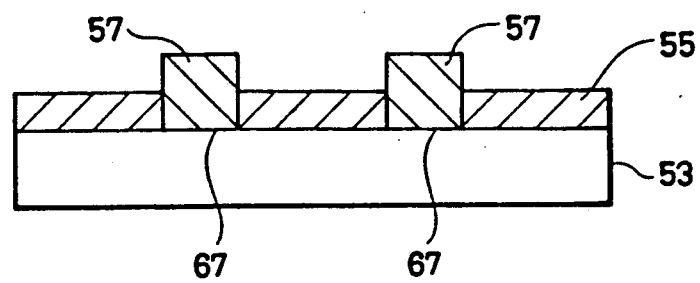

Thereafter, the transparent plate 53 is subjected to ultrasonic washing in a butyl cellosolve acetate solution, whereby the transparent resin layers positioned on the transparent electrodes 55 are removed, as shown in FIG. 4D. The transparent resin layers 57 on the non-electrode portions 67 are postbaked for 30 minutes at 180° C.

Figure 4E:
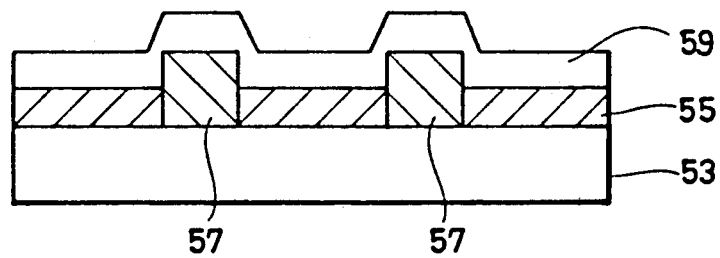

Then, as shown in FIG. 4E, a SiO$_2$ film 59 is formed by using a spin coater on the transparent plate 53 on which the transparent resin layers 57 are formed. The SiO$_2$ film is baked.

Figure 4F:
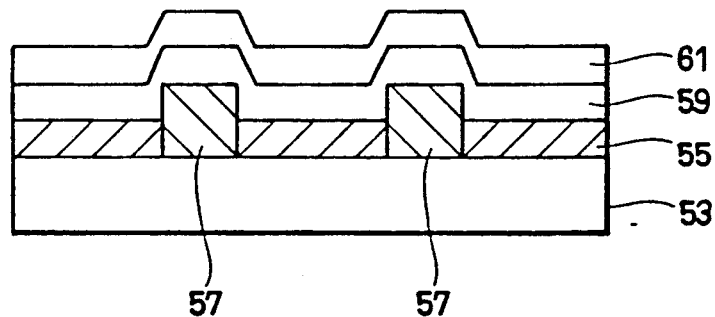

Then, as shown in FIG. 4F, a Nylon-6 film 61 is formed by spin coater on the SiO$_2$ film 59. The Nylon-6 film 61 is baked.

Rubbing was carried out on two transparent plates manufactured in this manner. If CS-1014 produced by CHISSO Corp. is used as the ferroelectric liquid crystal, orientation of the liquid crystal layers can be made uniform by carrying antiparallel rubbing. If CS-1013 produced by CHISSO Corp. is used as the ferroelectric liquid crystal, the orientation of the liquid crystal layers can be made uniform by carrying out parallel rubbing.

By arranging the two rubbed transparent plates opposing each other and by sealing ferroelectric liquid crystal in the space formed by the two transparent plates, a ferroelectric liquid crystal device 51 is provided. Cell thickness of the ferroelectric liquid crystal device 51 is 2.0 $\mu$m. The cell thickness is the distance from the transparent plate 53a to the transparent plate 53b, as represented by J in FIG. 1.

As shown in FIG. 2, in the first embodiment of the ferroelectric liquid crystal device in accordance with the present invention, a transparent resin layer 57b, thicker than the transparent electrode 55b, is provided on the non-electrode portion 67. Therefore, the distance between the alignment films 61a and 61b positioned on the non-electrode portions 67 is shorter than the distance between the alignment films 61a and 61b on the transparent electrodes 55a and 55b. Therefore, on the non-electrode portions 67, the difference between intensity of the polarities of the alignment films 61a and 61b can be enlarged. Accordingly, as shown in FIG. 3, the orientation of the liquid crystal molecules 63 can be made uniform on the non-electrode portions 67. The same can be applied to the liquid crystal molecules positioned on the non-electrode portions 68 shown in FIG. 1. Therefore, in accordance with the first embodiment of the ferroelectric liquid crystal device of the present invention, the state of display of the non-pixel portions can be made uniform.

It is preferred that the difference between the height of the transparent resin layer and the transparent electrode is not less than 1/10 of the cell thickness. If the difference is small, the difference between intensities of the polarities of the alignment films positioned on the non-electrode portions becomes small.

In accordance with the first embodiment, the alignment film positioned on the non-electrode portion is made higher than the alignment film positioned on the electrode portions by providing transparent resin layer on the non-electrode portions. However, the present invention is not limited thereto, and other insulating material may be used instead of the transparent resin layers.

Although an insulating film is provided in the first embodiment, the insulating film may not be formed provided that the cell thickness is thick enough to eliminate possibility of short circuit between electrodes.

If the electrode portions on one of the plates include one electrode layer, then a transparent resin layer may be provided between the electrodes on a plate on which a plurality of electrodes are formed.

Figure 5:
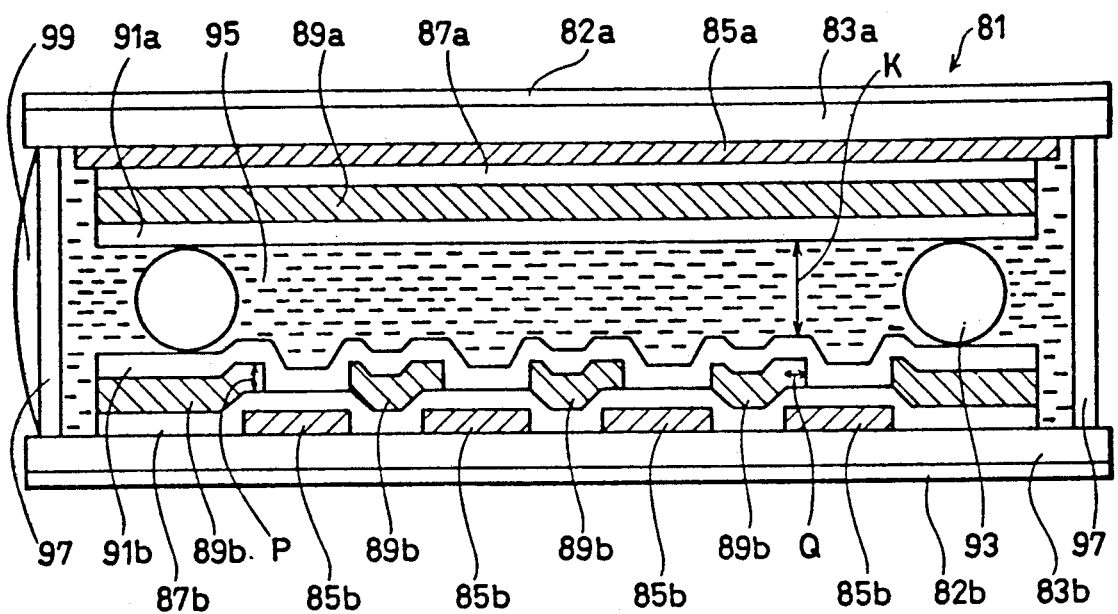
FIG. 5 is a cross sectional view of a second embodiment of the present invention.

A second embodiment of the ferroelectric liquid crystal device in accordance with the present invention will be described in the following. FIG. 5 is a cross sectional view of the second embodiment of the ferroelectric liquid crystal device in accordance with the present invention. As shown in FIG. 5, transparent plates 83a and 83b are arranged opposing to each other to form a space therebetween.

A plurality of transparent electrodes 85b are arranged spaced apart from each other on the transparent plate 83b. The thickness of the transparent electrodes 85b is 300 to 5000 Å. An insulating film 87b is formed to cover the transparent electrode 85b on the transparent plate 83b. The insulating film 87b is formed of $SiO_2$. The insulating film 87b is formed by sputtering. The thickness of the insulating film 87b is 300 to 5000 Å.

A black mask 89b is formed on the insulating film 87b positioned between the transparent electrodes 85b. Portions of the black mask 89b extend to the outside edge of the transparent electrode 85b on the main surface of the transparent electrode 85b. Portions of the black mask 89b which are positioned between the transparent electrodes 85b serve as light intercepting members. Portions of the black mask 89b which are positioned on the transparent electrodes 85b serve as the inversion preventing member. Color mosaics produced FUJI HANTO Electronics Technology Corp. were used as the material for the black mask 89b. The formation of the black mask 89b was carried out in the following manner. First, color mosaics were formed by using a spin coater on the entire surface of the insulating film 87b. The thickness of the color mosaic was 8500 Å. A photoresist was formed on the entire surface of the color mosaic. The color mosaic was selectively etched by using the photoresist as a mask. The photoresist left on the color mosaic was removed. Thus the formation of the black mask 89b was completed.

The alignment film 91b is formed to cover the black mask 89b on the insulating film 87b. The alignment film 91b is of polyimideamide. PSI-XS014 produced by CHISSO Corp. was used as the alignment film 91b. The formation of the alignment film 91b is done by using a spin coater. The thickness of the alignment film 91b is 500 Å. Rubbing is done on the main surface of the alignment film 91b.

Transparent electrodes 85a, an insulating film 87a, a black mask 89a and an alignment film 91a are formed in this order on the transparent plate 83a. The material and the thickness of each of the transparent plate 83a, the transparent electrodes 85a, the insulating film 87a, the black mask 89a and of the alignment film 91a are the same as those of the transparent plate 83b, the transparent electrodes 85b, the insulating film 87b, the black mask 89b and the alignment film 91b. Rubbing is also done on the main surface of the alignment film 91a. The direction of rubbing is the same as that on the main surface of the alignment film 91b.

Ferroelectric liquid crystals 95 are sealed between the alignment films 91a and 91b. The type of the ferroelectric liquid crystal 95 is chiral smectic C. ZLI-4237-000 produced by E. Merck was used as the ferroelectric liquid crystals 95. A sealing member 97 is provided around the space formed by transparent plate 83a and 83b. A filling inlet is provided at a portion of the sealing member 97, which is not shown in FIG. 5. The ferroelectric liquid crystals 95 are introduced to the cell from the filling inlet. Filling is done in vacuum. The filling inlet is closed by using a resin. The resin was acrylic UV hardening type resin. The reference numeral 99 in FIG. 5 represents a portion of the resin.

Figure 25:
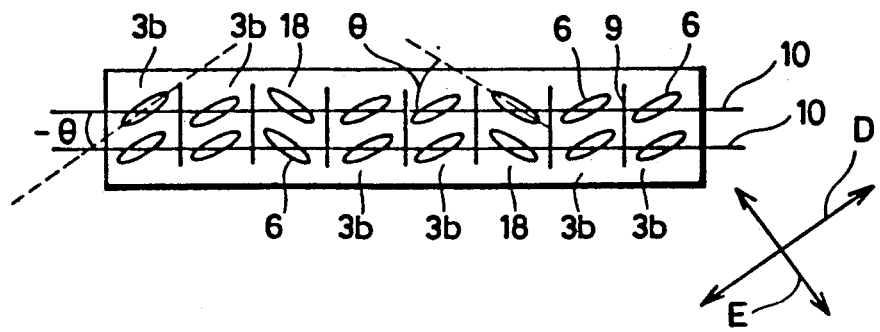
FIG. 25 is a cross sectional view taken along the direction of the arrow XXV of FIG. 24.
Figure 26:
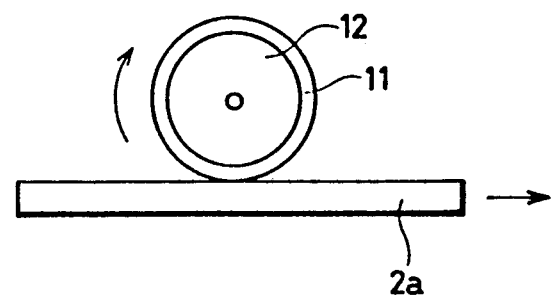
FIG. 26 shows rubbing of a plate.
Figure 27:
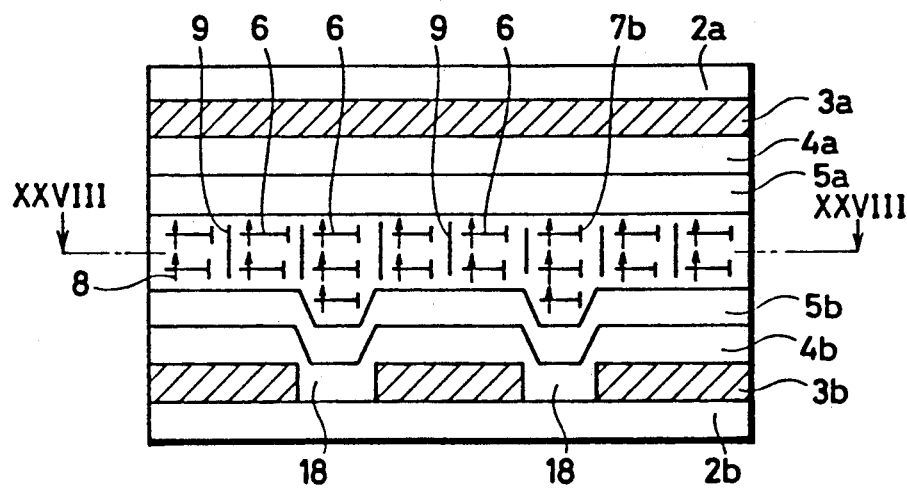
FIG. 27 is a cross sectional view taken along the line XXIV of FIG. 23 in a second state; 7
Figure 28:
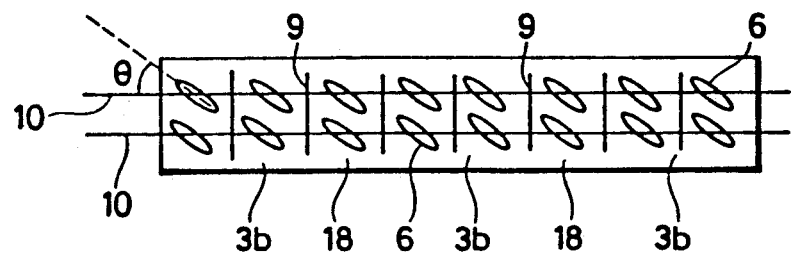
FIG. 28 is a cross sectional view taken along the direction of the arrow XXVIII of FIG. 27.
Figure 29:
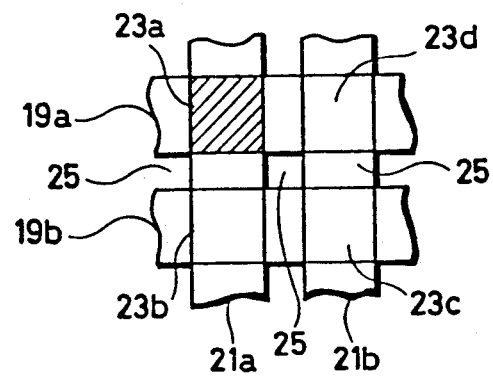
FIG. 29 is a partial plan view showing pixel portions and non-pixel portions of a conventional ferroelectric liquid crystal device.
Figure 30:
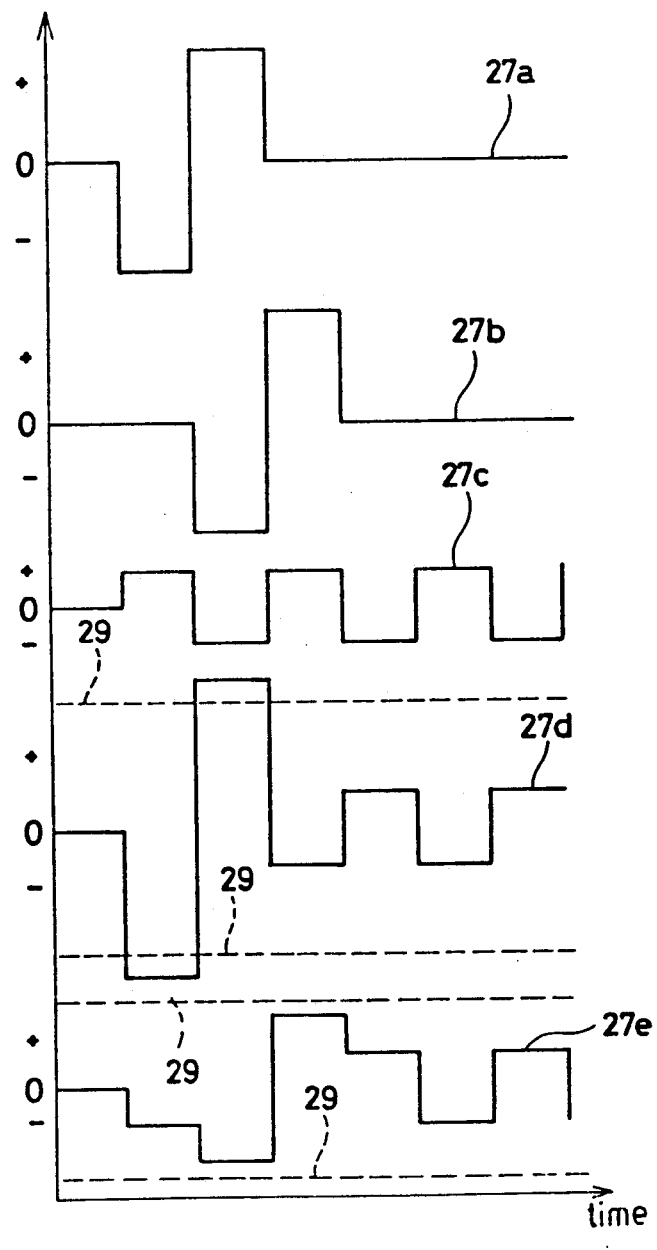
FIG. 30 is a diagram of waveforms of pulses applied to the electrode portion.
Figure 31:
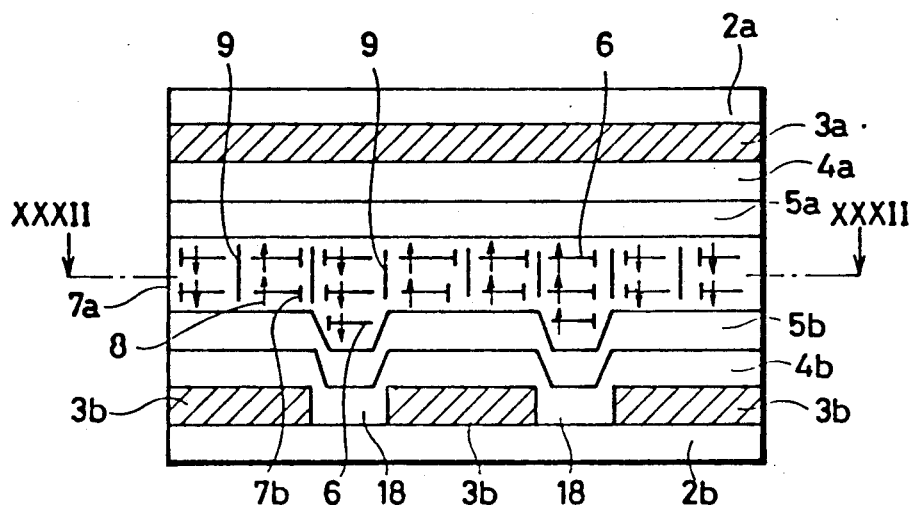
FIG. 31 is a cross sectional view of a conventional ferroelectric liquid crystal device in which display state of non-pixel portion is uneven.
Figure 32:
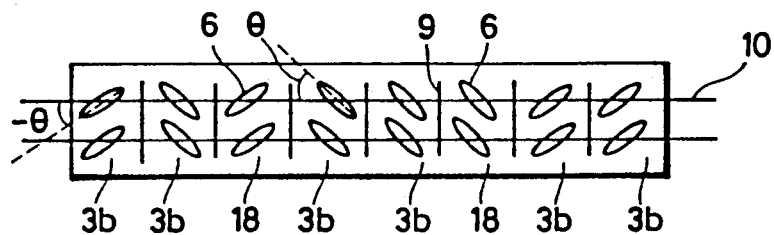
FIG. 32 is a cross sectional view taken along the direction of the arrow XXXII of FIGS. 31.
Figure 33:
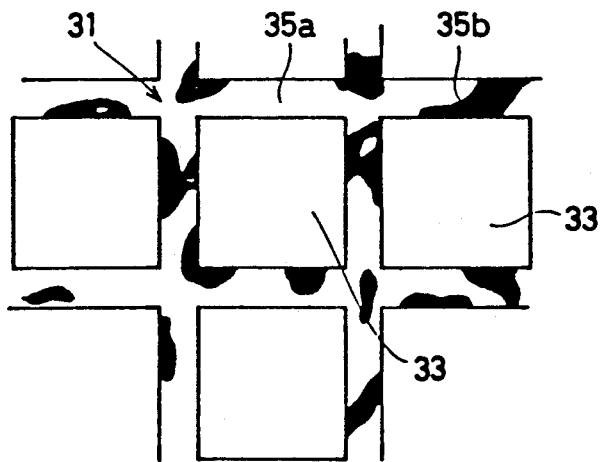
FIG. 33 is a plan view of non-pixel portion in which the display state is uneven.
Figure 34:
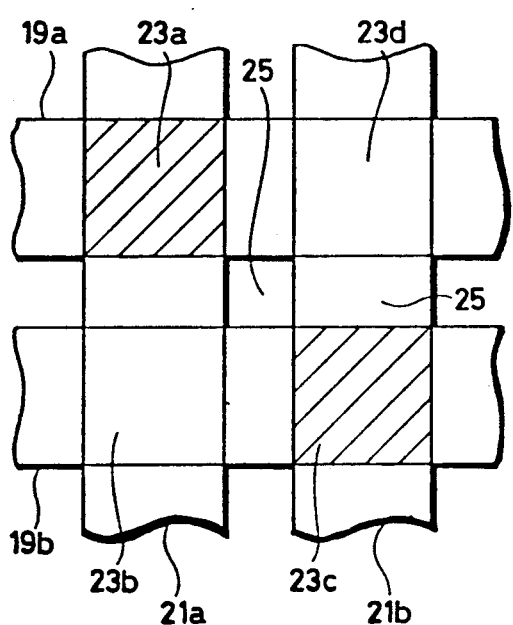
FIGS. 34 and 35 are partial plan views showing pixel portions and non-pixel portions of a conventional ferroelectric liquid crystal device.
Figure 35:
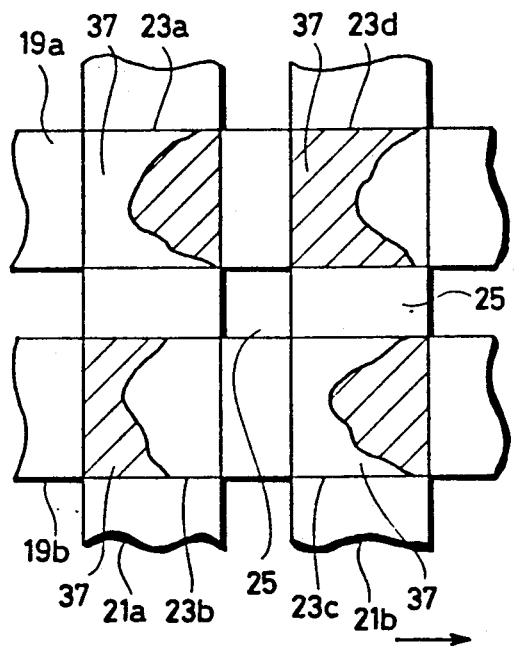

A deflecting plate 82a is provided on the transparent plate 83a. The deflecting plate 82a transmits light only in the direction of D in FIG. 25. A deflecting plate 82b is provided below the transparent plate 83b. The deflecting plate 82b transmits light only in the direction of E of FIG. 25.

The thickness of the liquid crystal layer (represented by K) between the black mask 89b on the transparent electrode 85b and the black mask 89a on the transparent electrode 85a is 1.0 $\mu$m. The thickness of the liquid crystal layer between the portion of the transparent electrode 85b on which the black mask 89b is not provided and a portion of the transparent electrode 85a on which the black mask 89a is not provided, is 1.8 $\mu$m.

Figure 6:
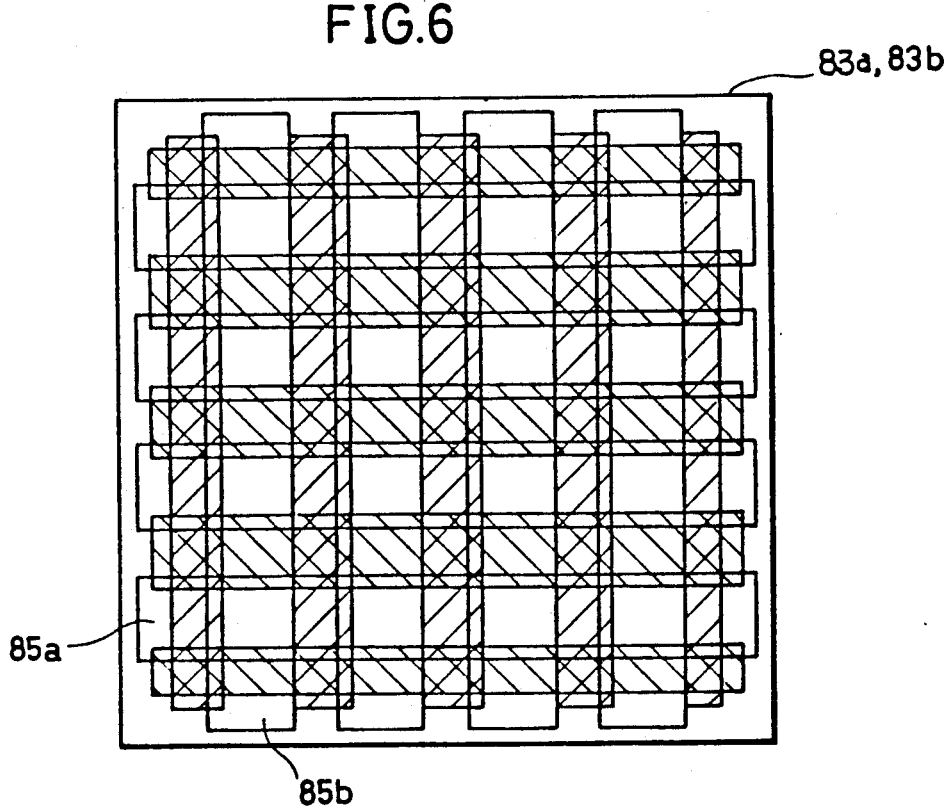
FIG. 6 is a plan view with one and the other plates included in the second embodiment stacked.

The method of positioning black masks 89a and 89b will be described with reference to FIGS. 6, 7 and 8.

Figure 7:
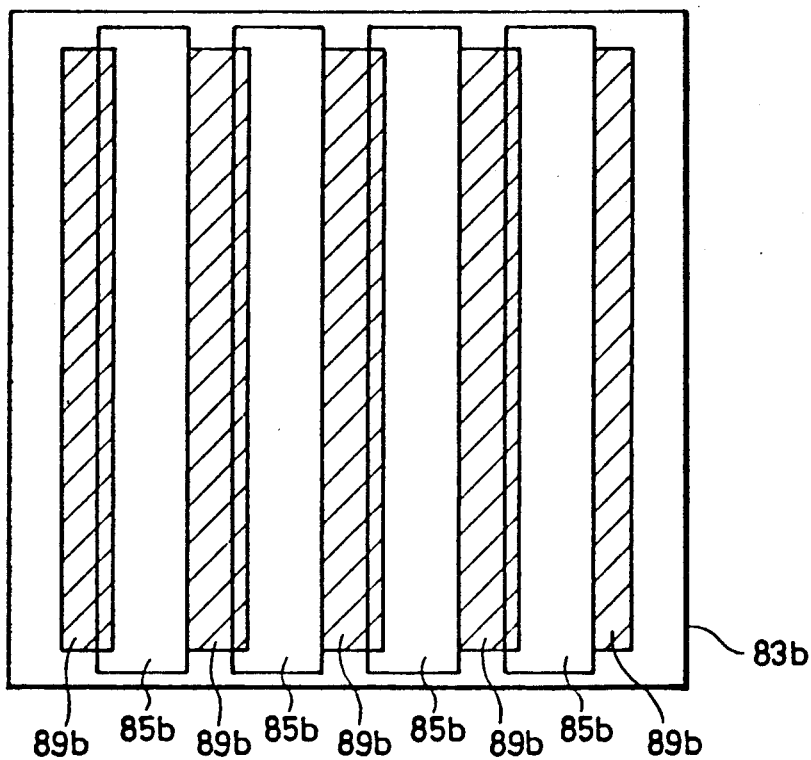
FIG. 7 is a plan view of one plate of the second embodiment.
Figure 8:
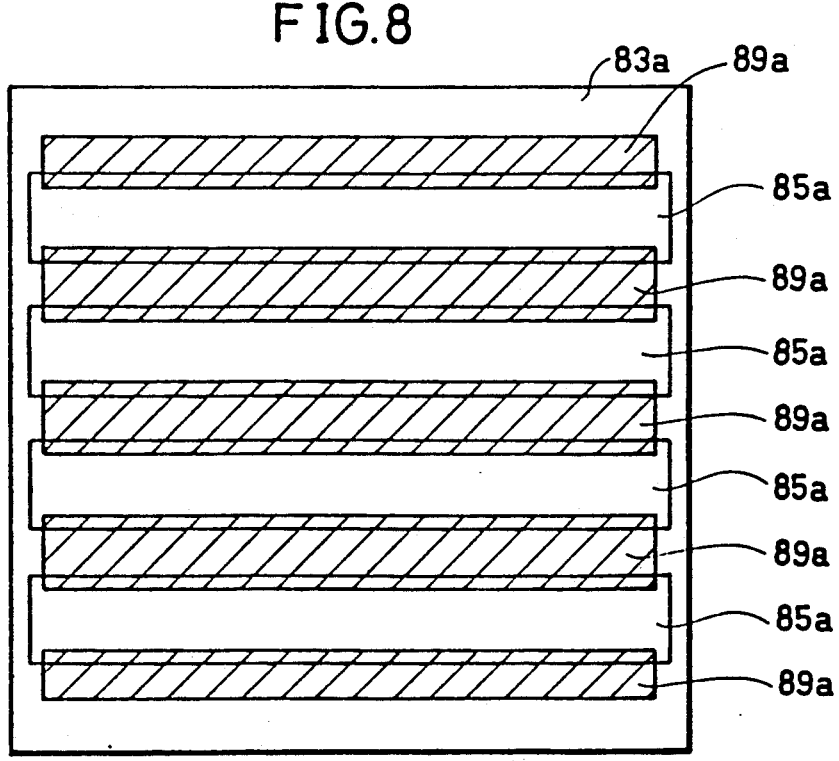
FIG. 8 is a plan view of the other plate of the second embodiment.

As shown in FIG. 7, a plurality of transparent electrodes 85b are arranged spaced apart from each other on the main surface of the transparent plate 83b. Black masks 89b are arranged between the transparent electrodes 85b. Portions of the black mask 89b extend to the left side edge of the transparent electrode 85b. As shown in FIG. 8, a plurality of transparent electrodes 85a are arranged spaced apart from each other on the main surface of the transparent plate 83a. The direction of extension of the transparent electrodes 85a is orthogonal to the direction of extension of the transparent electrodes 85b shown in FIG. 7. Black masks 89a are arranged between the transparent electrodes 85a. Portions of the black mask 89a extend to both side edges of the transparent electrode 85a. FIG. 6 shows a state in which the transparent plate 83a shown in FIG. 8 is positioned over the transparent plate 83b shown in FIG. 7.

Figure 10:
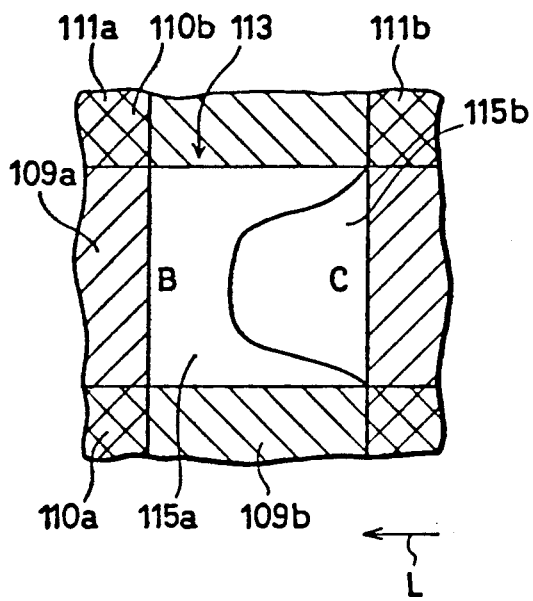
FIGS. 10 to 13 are plan views of a pixel portion.
Figure 11:
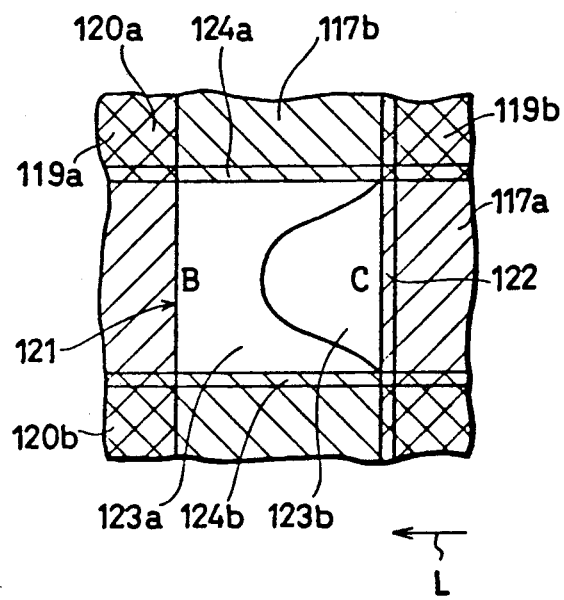
Figure 12:
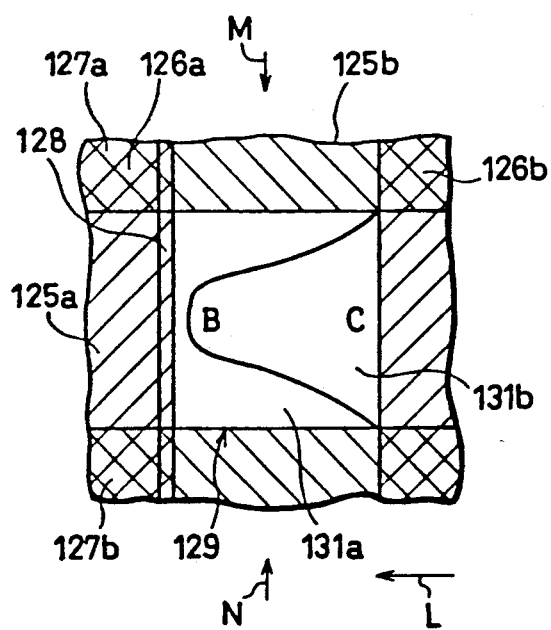
Figure 13:
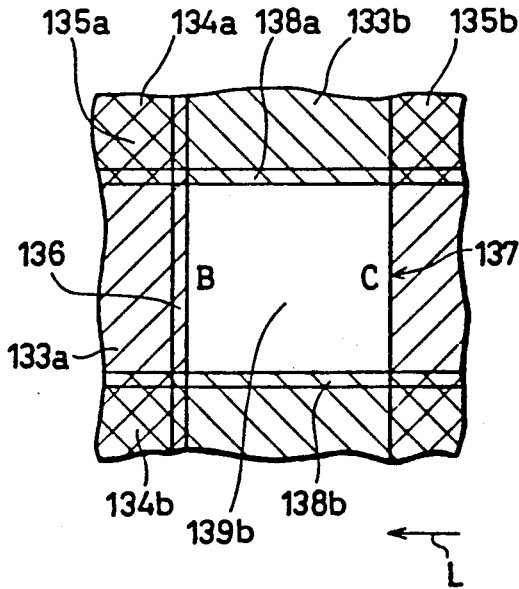

Pixels such as shown in FIGS. 10, 11, 12 and 13 are formed to test the effects of the second embodiment of the ferroelectric liquid crystal device in accordance with the present invention. FIG. 13 shows a pixel portion of the second embodiment of the ferroelectric liquid crystal device in accordance with the present invention. FIGS. 10, 11 and 12 are also pixel portion of the ferroelectric liquid crystal device in accordance with the present invention.

The pixel portion 113 shown in FIG. 10 will be described. The pixel portion 113 is a region where an electrode 109a intersects an electrode 109b in three dimensions. Black masks 110a and 110b are provided on both sides of the electrode 109a. Black masks 111a and 111b are provided on both sides of the electrode 109b.

The pixel portion 121 of FIG. 11 will be described. The pixel portion 121 is a region where an electrode 117a intersects with an electrode 117b in three dimensions. Black masks 119a and 119b are provided on both sides of the electrode 117b. A portion of the black mask 119b extends over the electrode 117b, which is represented by 122. Black masks 120a and 120b are provided on both sides of the electrode 117a. A portion of the black mask 120a extends over the electrode 117a, which portion is represented by 124a. A portion of the black mask 120b extends over the electrode 117a, which portion is represented by 124b.

The pixel portion 129 shown in FIG. 12 will be described. The pixel portion 129 is a region where an electrode 125a intersects with an electrode 125b in three dimensions. Black masks 126a and 126b are provided on both sides of the electrode 125b. A portion of the black mask 126a extends over the electrode 125, which portion is represented by 128. Black mask 127a and 127b are provided on both sides of the electrode 125a.

The pixel portion 137 shown in FIG. 13 will be described. The pixel portion 137 is a region where an electrode 133a intersects with an electrode 133b in three dimensions. Black masks 134a and 134b are provided on both sides of the electrode 133a. A portion of the black mask 134a extends over the electrode 133a, which portion is represented by 138a. A portion of the black mask 134b extends over the electrode 133a, which portion is represented by 138b. Black masks 135a and 135b are provided on both sides of the electrode 133b. A portion of the black mask 135a extends over the electrode 133b, which portion is represented by 136.

Rubbing was done in the direction shown by L on all of the pixel portions shown in FIGS. 10 to 13. Therefore, the area represented by B in FIG. 36 corresponds to the left side of the pixel portions. The area C of FIG. 36 corresponds to the right side of the pixel portion.

Figure 9:
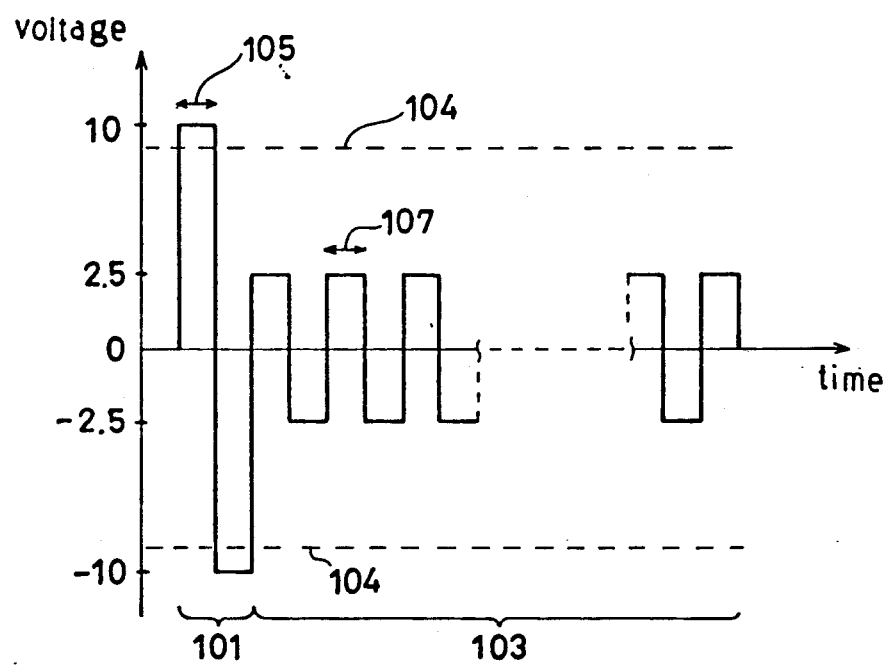
FIG. 9 is a diagram of waveform of the pulses applied to the pixel portion.

A voltage large enough to invert the spontaneous polarization of the liquid crystal molecule was supplied to the pixel portions shown in FIGS. 10 to 13, and the spontaneous polarization of the liquid crystal molecules was inverted. A voltage not large enough to invert the spontaneous polarization of the liquid crystal molecules was applied for a prescribed time period to see whether the spontaneous polarization of the liquid crystal molecules was inverted again or not. The voltage applied to the pixel portion is as shown in FIG. 9. The voltage is the voltage applied to the pixel portion during multiplex driving. The reference numeral 101 represents a switching pulse, which exceeds the threshold value 104. The spontaneous polarization of the liquid crystal molecules is inverted by the switching pulse 101. $V_{PP}$ of the switching pulse 101 is 20 V, and the pulse width 105 of the switching pulse 101 is 200 μsec. The reference numeral 103 represent a biasing pulse. $V_{PP}$ of the biasing pulse is 5 V, and the pulse width of the biasing pulse 103 is 200 μsec. After the application of the biasing pulse 103 for 15 sec, photographs of the pixel portions were taken. The photographs were image processed by a computer and the pixel portions were divided into areas where the spontaneous polarization was inverted and areas where the spontaneous polarization was not inverted. The results are shown in FIGS. 10 to 13. In the pixel portion 113 shown in FIG. 10, there is an area 115a in which the 10 spontaneous polarization is inverted, and an area 115b in which the spontaneous polarization is not inverted. The area 115a in which the spontaneous polarization is inverted spread from B to C.

On the contrary, in the pixel portion 137 of the second embodiment of the ferroelectric liquid crystal device in accordance with the present invention shown in FIG. 13, there is only an area 139b in which the spontaneous polarization is not inverted. The reason for this may be the fact that the black mask represented by 136 exists in the direction B, where the spontaneous polarization tends to be inverted.

In the pixel portion 121 shown in FIG. 11, there is an area 123a in which the spontaneous polarization is inverted, and an area 123b in which the spontaneous polarization is not inverted. The reason for this may be the fact that there is no black mask extending over the electrode 117b in the B side where the spontaneous polarization tends to be inverted.

In the pixel portion 129 shown in FIG. 12, there is an area 131a in which the spontaneous polarization is inverted and an area 131b in which the spontaneous polarization is not inverted. The black mask 127a does not extend over the electrode 125. The black mask 127b does not extend over the electrode 125a. Therefore, inversions of the spontaneous polarization spreads from the direction represented by M and from the direction represented by N. Therefore, it is understood that the black masks 138a and 138b shown in FIG. 13 contribute to prevent the inversion of the spontaneous polarization.

The same experiment was carried out with the ratio of the biasing pulse and the switching pulse changed. The percentage of the area in which the spontaneous polarization was not inverted to the area of the pixel portion was calculated. The results are shown in Table 1.

TABLE 1

| $V_b/V_s$ | Pixel Portion 113 | Pixel Portion 121 | Pixel Portion 129 | Pixel Portion 137 |
|---|---|---|---|---|
| ¼ | 56% | 58% | 65% | 100% |
| ⅓ | 32% | 32% | 35% | 100% |
| ½ | 5% | 5% | 7% | 95% |

The reference character $V_b$ represents the voltage of the biasing pulse. The reference character $V_s$ represents the voltage of the switching pulse, which is always constant.

As is apparent from Table 1, in the pixel portion 137 of the second embodiment of the ferroelectric liquid crystal device in accordance with the present invention, the area of the region in which the spontaneous polarization of the liquid crystal molecules is not inverted is large, even when the values $V_s$ and $V_b$ is close to each other. The values $V_b$ and $V_s$ become close to each other as the number of electrodes is increased. Therefore, it is understood that the second embodiment of the ferroelectric liquid crystal device in accordance with the present invention is effective even when the number of electrodes is increased.

It is confirmed that the effect of preventing inversion of the spontaneous polarization of the liquid crystal molecules is especially notable when the thickness represented by P of the black mask 89b positioned on the transparent electrode 85b shown in FIG. 5 is not less than 0.2 μm. The length of the black mask 89b shown by Q in FIG. 5 on the electrode portion 85b has no influence on the effect of preventing inversion of the spontaneous polarization of the liquid crystal molecules. In the second embodiment, the value Q is 2 μm.

Ferroelectric liquid crystal devices in which the thickness of the liquid crystal layer between the electrode portions is 1.8 μm and the thickness of the liquid crystal layer between the non-electrode portion is 0.3 μm, 0.5 μm, 0.8 μm and 1.6 μm, respectively are formed. In the ferroelectric liquid crystal device in which the thickness of the liquid crystal layer between the non-electrode portions is not more than 0.5 μm, a large number of disclinations are generated. Since liquid crystal molecules do not exist in the portions of disclinations, control of light can not be done at these portions. Therefore, the quality of display of the ferroelectric liquid crystal device in which a large number of disclination are generated significantly reduced.

Black masks may be formed on all of 4 sides defining the shape of the pixel portion. The reason for this will be described with reference to FIGS. 14, 15 and 16.

Figure 14:
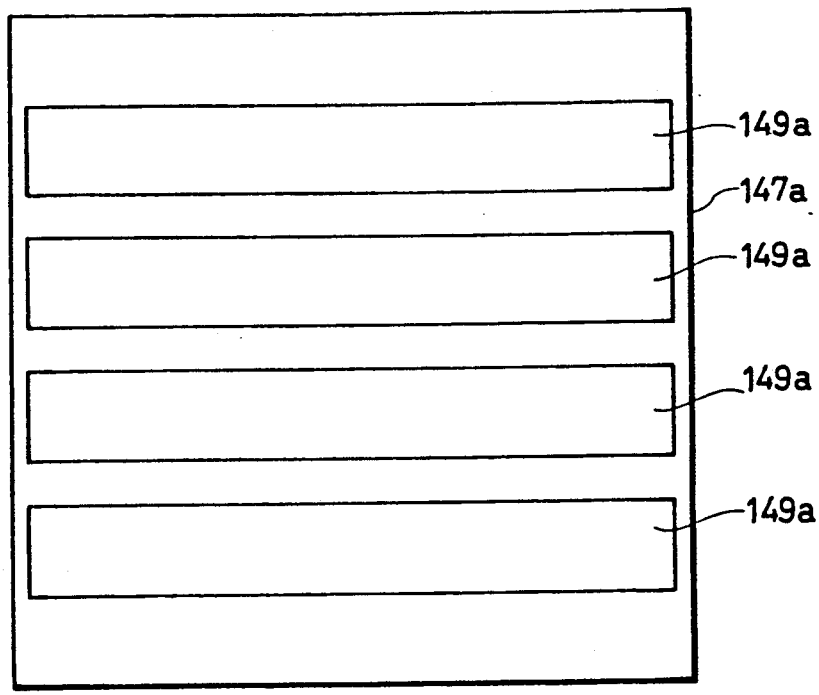
FIG. 14 is a plan view of one plate included in a first modification of the second embodiment.
Figure 15:
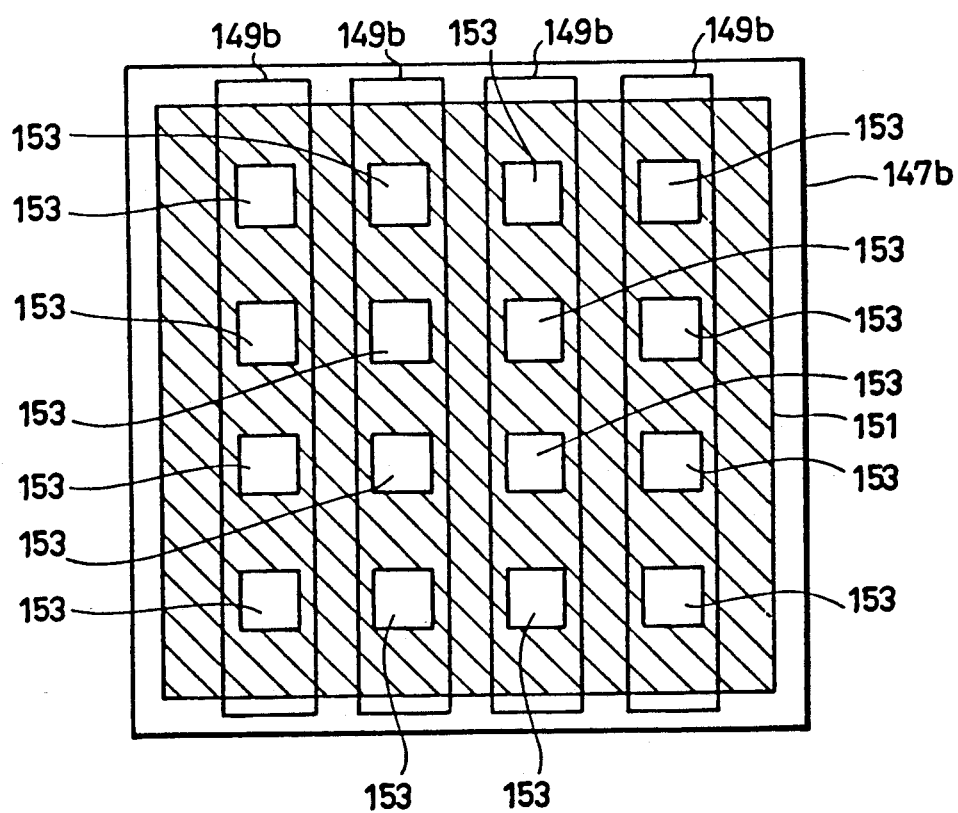
FIG. 15 is a plan view of the other plate included in the first modification of the second embodiment.
Figure 16:
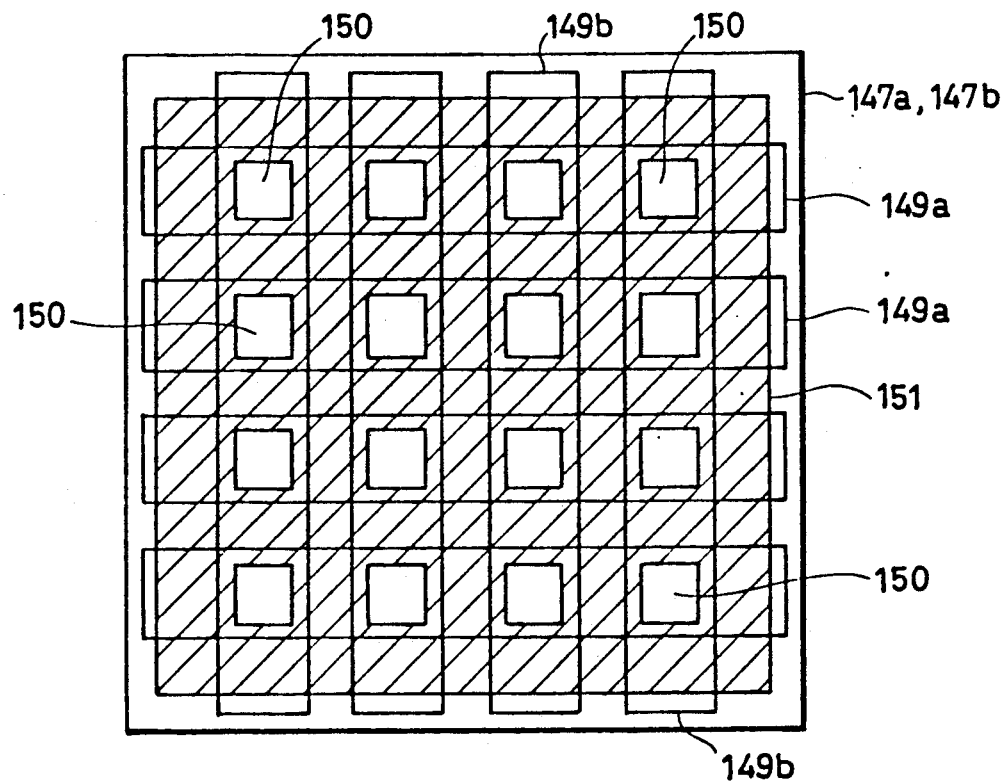
FIG. 16 is a plan view showing one and the other plates included in the first modification of the second embodiment stacked.

As shown in FIG. 14, a plurality of transparent electrodes 149a are arranged spaced apart from each other on the main surface of the transparent plate 147a. No black mask is formed on the main surface of the transparent plate 147a. As shown in FIG. 15, a plurality of transparent electrodes 149b are arranged spaced apart from each other on the main surface of the transparent plate 147b. A black mask 151 is formed covering the transparent electrodes 149b on the main surface of the transparent plate 147b. Areas represented by 153 on the transparent electrodes 149b are not covered with the black mask 151. FIG. 16 shows a structure provided by stacking the transparent plate 147a shown in FIG. 14 and the transparent plate 147b shown in FIG. 15. The areas at which the transparent electrodes 149a intersect with the transparent electrodes 149b constitute pixel portions 150. The same experiment as carried out on the pixel portions shown in FIGS. 10 to 13 was carried out on the pixel portion 150. The results are shown in Table 2 and FIG. 20.

Figure 20:
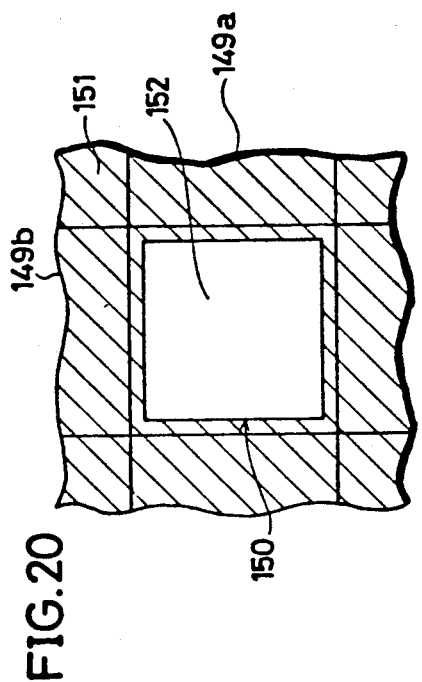
FIG. 20 is a plan view of a pixel portion of the first modification of the second embodiment.

As shown in FIG. 20, there is only an area 152 in which the spontaneous polarization is not changed in the pixel portion 150.

TABLE 2

| $V_b/V_s$ | Pixel Portion 150 |
|---|---|
| ½ | 100% |
| ⅓ | 100% |
| ¼ | 95% |

As is apparent from Table 2, even when the values $V_b$ and $V_s$ become close to each other, the area in which the spontaneous polarization of the liquid crystal molecules is not inverted is large.

Figure 36:
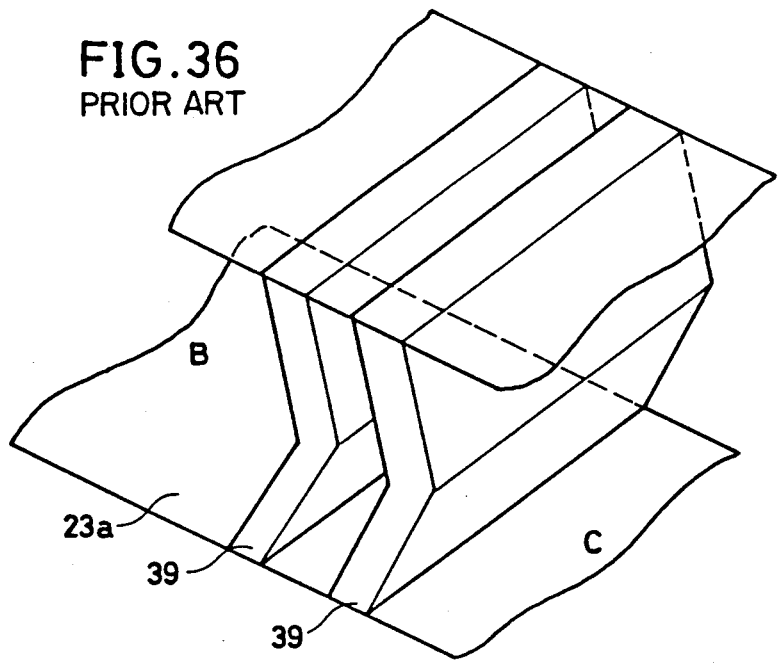
Figure 37:
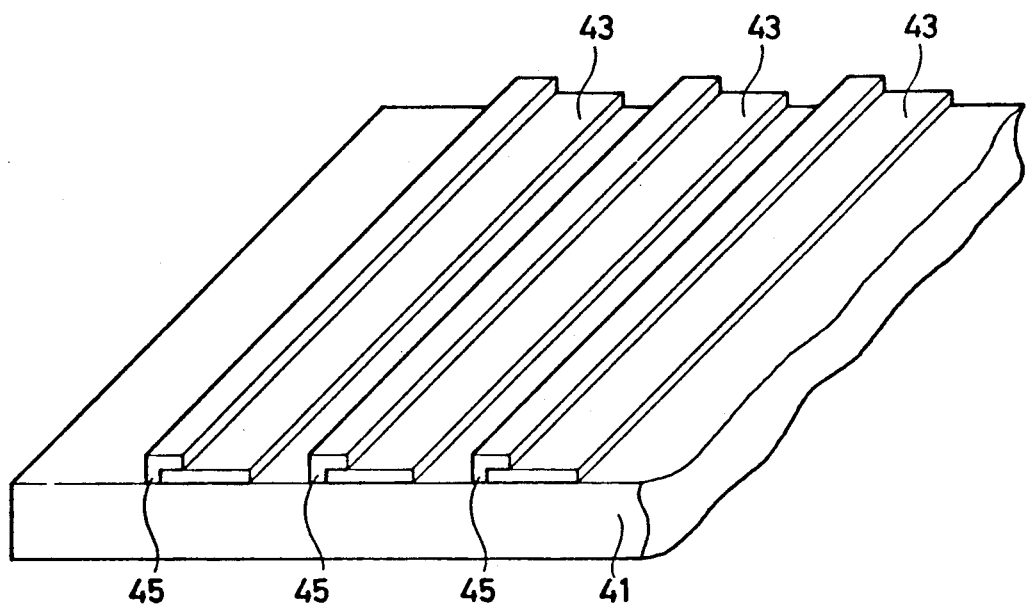
FIG. 37 is a perspective view of a plate included in another example of a conventional ferroelectric liquid crystal device.
Figure 38:
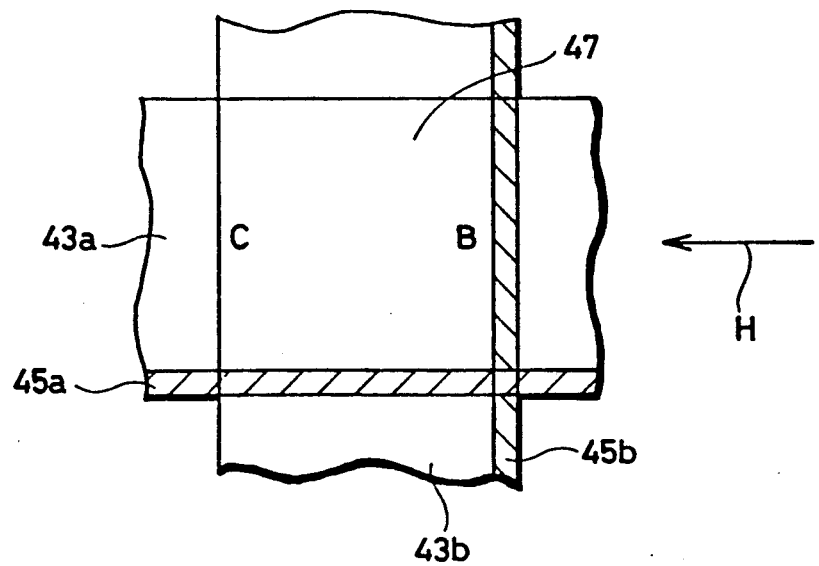
FIG. 38 is a plan view of a pixel portion of another example of a conventional ferroelectric liquid crystal device.
Figure 39:
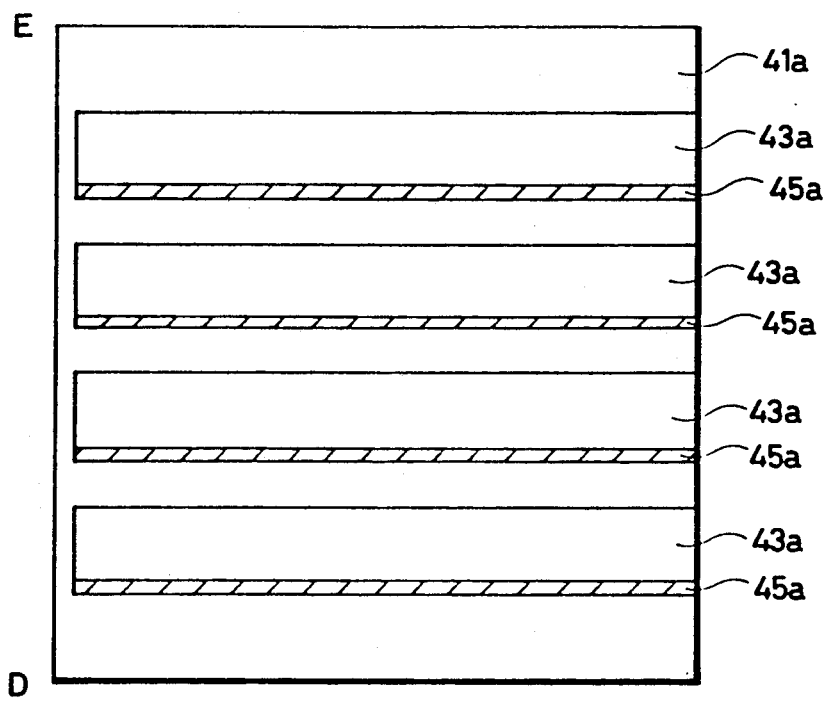
FIG. 39 is a plan view of one plate included in another example of the conventional ferroelectric liquid crystal device.
Figure 40:
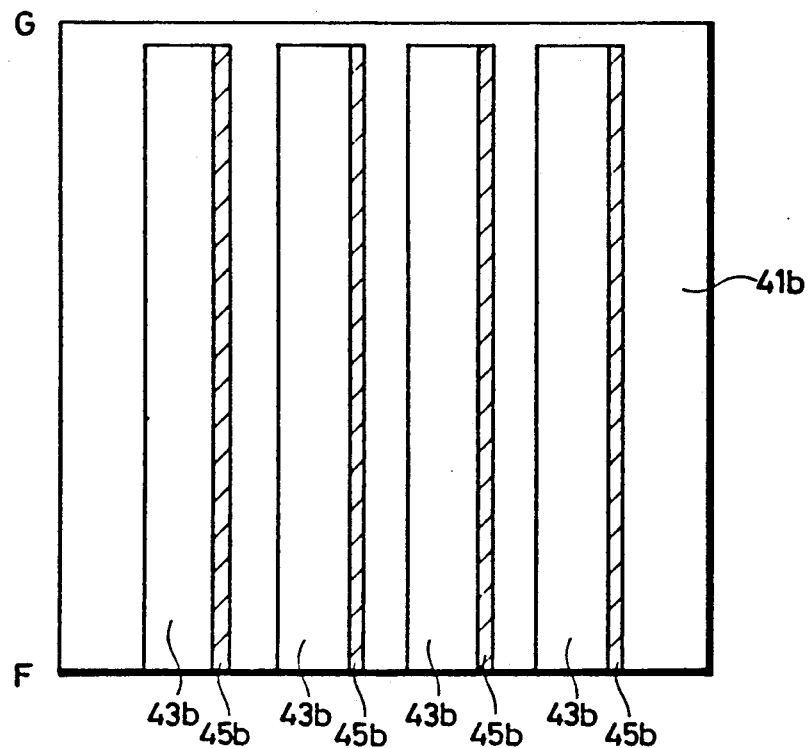
FIG. 40 is a plan view of the other plate included in another example of the conventional ferroelectric liquid crystal device.

Now, there are black masks 151 on all of the four sides defining the shape of the pixel portion 150 shown in FIG. 16. Therefore, the inversion of the spontaneous polarization of the liquid crystal molecule can be prevented no matter where the area represented by B in FIG. 36 is positioned on the pixel portion 150.

The following is a method of forming black mask on four sides defining the shape of the pixel portion. The method will be described with reference to FIGS. 17 and 19.

Figure 17:
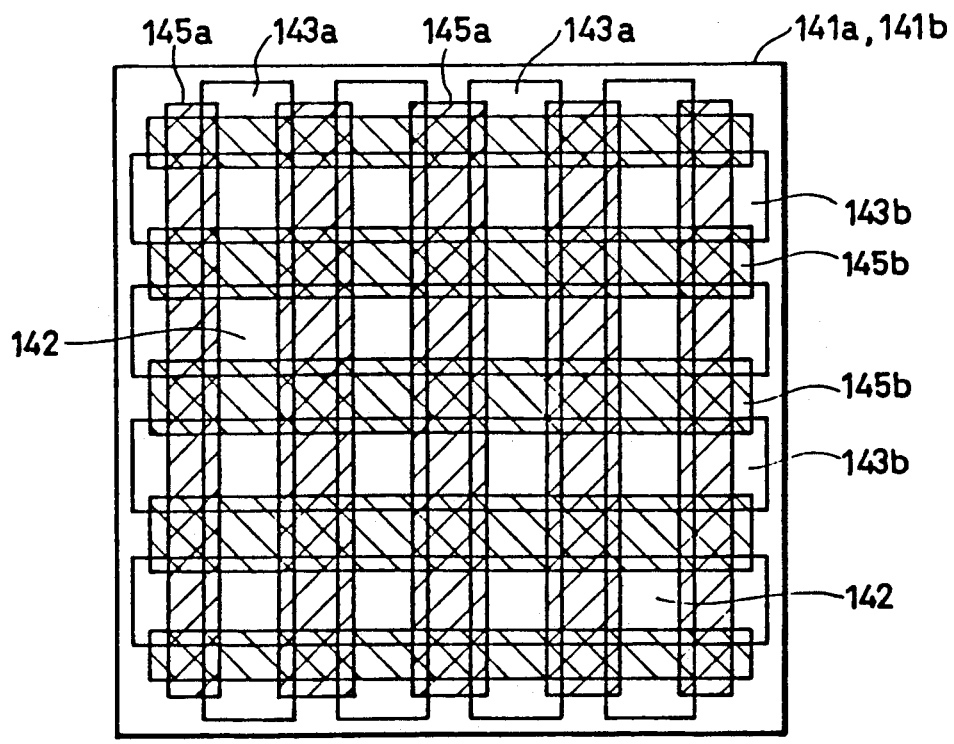
FIG. 17 is a plan view of the one and the other plate included in a second modification of the second embodiment stacked.
Figure 18:
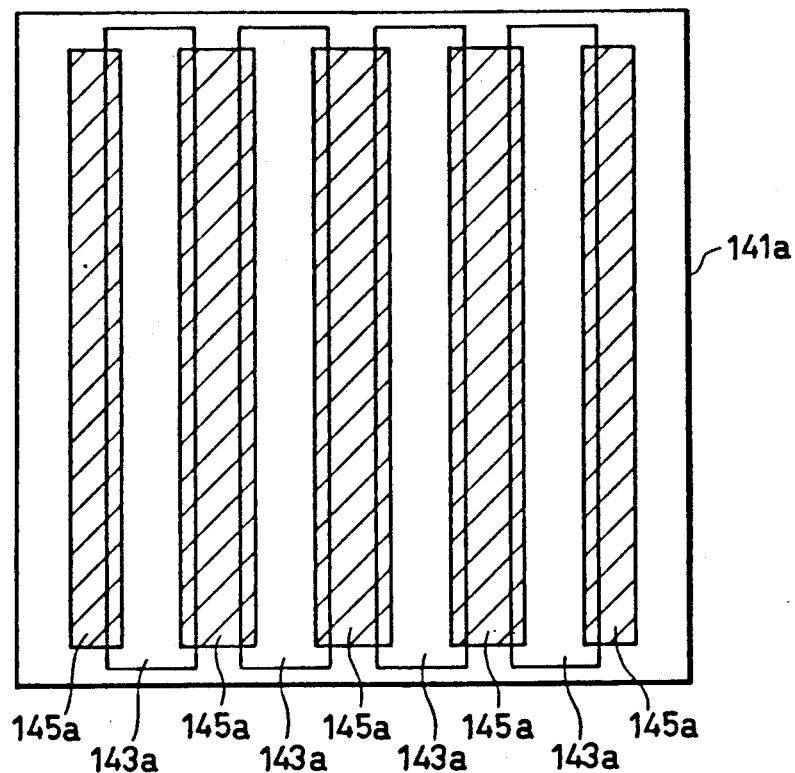
FIG. 18 is a plan view of one plate included in the second modification of the second embodiment.
Figure 19:
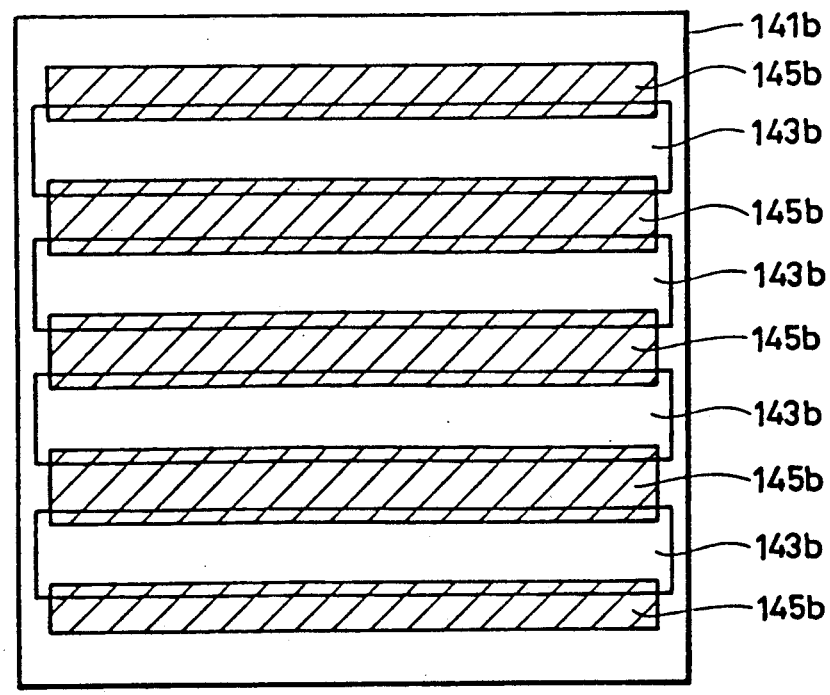
FIG. 19 is a plan view of the other plate included in the second modification of the second embodiment.

As shown in FIG. 18, a plurality of transparent electrodes 143a are arranged spaced apart from each other on the main surface of a transparent plate 141a. Black masks 145a are formed between the transparent electrodes 143a. The black mask 145a extends to the side edges of the transparent electrode 143a. As shown in FIG. 19, a plurality of transparent electrodes 143b are arranged spaced from each other on the main surface of a transparent plate 141b. Black masks 145b are formed between the transparent electrodes 143b. The black mask 145b extends over the side edges of the transparent electrode 143b. FIG. 17 shows a structure provided by stacking the transparent plate 141a shown in FIG. 18 and the transparent plate 141b shown in FIG. 19. By forming black masks as shown in FIGS. 18 and 19, pixel portions 142 can be surely provided when the transparent plate 141a and the transparent plate 141b are overlapped, even if the alignment therebetween is slightly deviated.

On the contrary, if the black masks are formed as shown in FIGS. 14 and 15, the pixel portions 150 cannot be formed unless the transparent electrodes 149a are positioned on the electrode portions 153 which are not covered with the black mask. Since the area of the portion of the electrode portion 153 not covered with the black mask is small, it is difficult to manufacture the ferroelectric liquid crystal device, when the black mask are formed as shown in FIGS. 14 and 15.

Any light intercepting material may be used for the black mask. Any of gelatin, polyimide, acryl polymer methacrylate polymer and so on including any of dye, pigment, carbon powder and the like may be used as the black mask employed in the present invention, for instance. Metal or inorganic oxide may be used. However, if a metal is used as a material of the black mask, an insulating film 87b must be provided between the black mask 89b and the transparent electrode 85b as shown in FIG. 5. Otherwise, there will be a short circuit between the transparent electrodes 85b. Lift-off method or a method of selectively depositing black mask on desired portion by using mask may be used as the method of forming the black mask.

Rubbing of an organic alignment film such as polyimides, polyamides or polyvinyl alcohol, oblique incident evaporation of $SiO_2$, method using a LB (Langmuir Blodgett) film may be used as a method of aligning the liquid crystal molecules.

Figure 21:
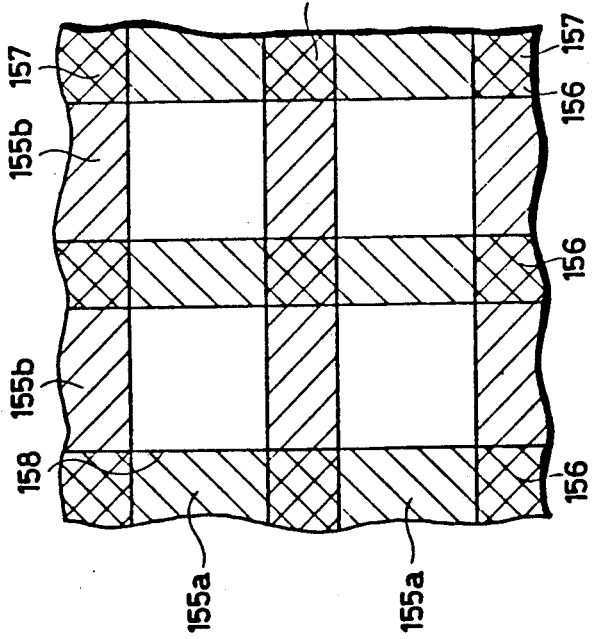
FIG. 21 is a partial plan view of one and the other plates stacked included in a third modification of the second embodiment.
Figure 23:
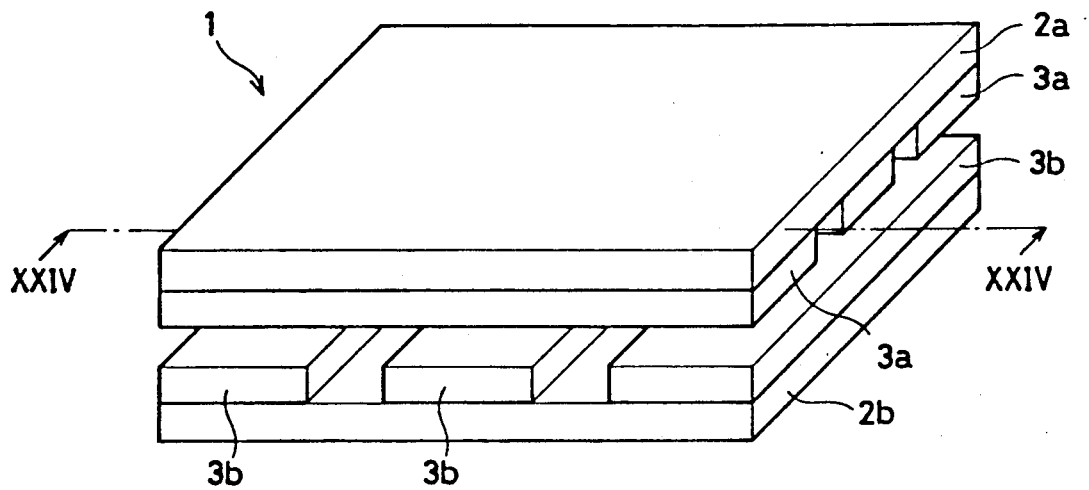
FIG. 23 is a perspective view schematically showing a conventional ferroelectric liquid crystal device.
Figure 24:
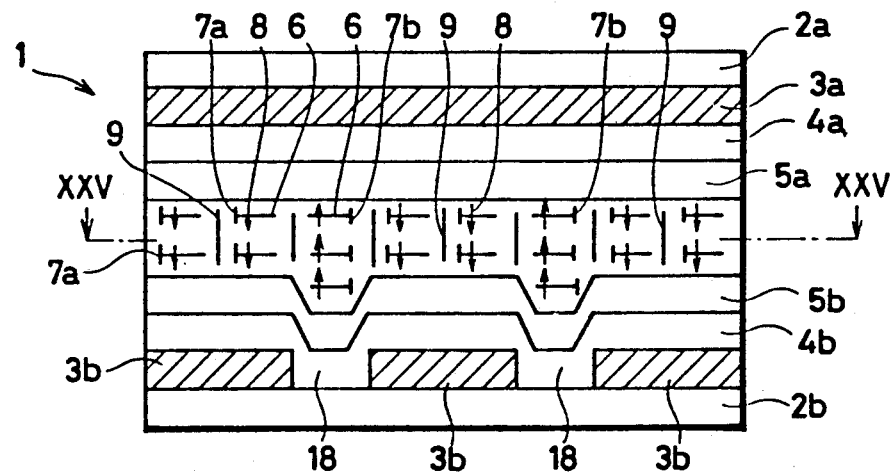
FIG. 24 is a cross sectional view taken along the direction of the arrow XXIV of FIG. 23 in a first state.

Another example of the ferroelectric liquid crystal device in accordance with the present invention will be described in the following. FIG. 21 shows the device.

As shown in FIG. 21, electrodes 155a are arranged spaced apart from each other. Electrodes 155b are arranged spaced apart from each other. Areas where the electrodes 155a intersect with the electrodes 155b in three dimensions constitute pixel portions 158. Black masks 157 are formed between the electrodes 155a. Black masks 156 are formed between the electrodes 155b. Since the masks 157 and 156 are black, the display of the non-pixel portions can be made uniform without making the thickness of the transparent resin layers 57b larger than the thickness of the transparent electrodes 55b as shown in FIG. 1.

Figure 22:
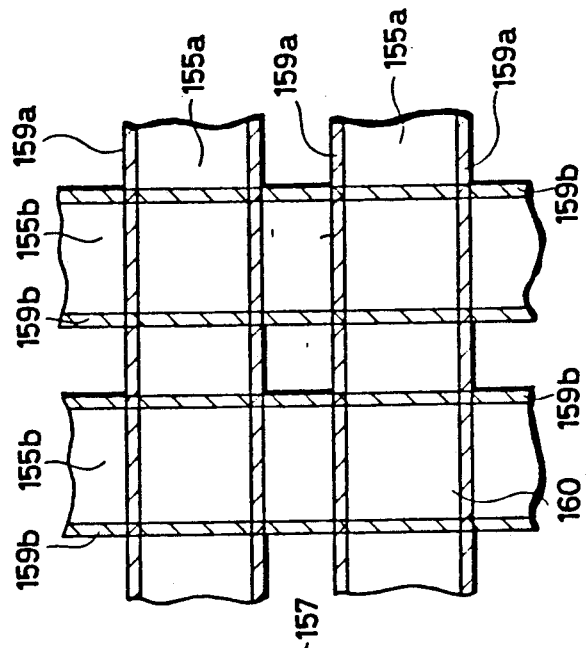
FIG. 22 is a partial plan view of one and the other plates stacked included in a fourth modification of the second embodiment.

A further example will be described with reference to FIG. 22. Transparent electrodes 155a are arranged spaced apart from each other. Black masks 159a are formed on side edges of the transparent electrodes 155a. Electrodes 155b are formed spaced apart from each other. Black masks 159b are formed on the side edges of the electrodes 155b. Areas where the electrodes 155a and 155b intersect with each other in three dimensions constitute pixel portions 160. In this example, although the state of display of the non-electrode portion can not be made uniform, the state of display of the pixel portions 160 can be made uniform. p Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A ferroelectric liquid crystal device having ferroelectric liquid crystals sealed between first and second plates arranged opposing each other to form a space, comprising:
   a second electrode portion arranged on a surface of said second plate, facing said first plate;
   a plurality of first electrode portions arranged, spaced apart from each other, on a surface of said first plate facing said second plate;
   light intercepting members provided between adjacent ones of said first electrode portions, partially overlapping each of said plurality of first electrode portions; and an inversion preventing member provided on an outside edge of an area where said plurality of first electrode portions and said second electrode portion overlap with each other on the main surface of one of said first and second electrode portions for preventing undesired inversion of spontaneous polarization of molecules of said ferroelectric liquid crystals, said inversion preventing member being provided on a side of said outside edge on which said inversion of spontaneous polarization tends to occur.

2. A ferroelectric liquid crystal device according to claim 1, wherein said light intercepting member is electrically insulative.

3. The ferroelectric liquid crystal device according to claim 1, further comprising:

a first alignment film formed to cover said plurality of first electrode portions and said light intercepting members; and a second alignment film formed to cover said second electrode portion, the distance between the second alignment film and the first alignment film positioned on the light intercepting members being less than the distance between the second alignment film and the first alignment film positioned on the plurality of first electrode portions.

4. A ferroelectric liquid crystal device according to claim 1, wherein said inversion preventing member is at least 0.2 $\mu$m in thickness.

5. A ferroelectric liquid crystal device according to claim 1, wherein said inversion preventing member is provided on the main surface of said first electrode portion.

6. A ferroelectric liquid crystal device according to claim 5, wherein said inversion preventing member covers a portion existing between adjacent ones of said first electrode portions, said inversion preventing member being positioned in this portion serving as said light intercepting member.

7. A ferroelectric liquid crystal device according to claim 1, wherein said second electrode portion comprises a plurality of second electrode portions arranged so as to be spaced apart from each other on a main surface of said second plate, and said plurality of second electrode portions and said plurality of first electrode portions intersect with each other in three dimensions.

8. A ferroelectric liquid crystal device according to claim 7, wherein said light intercepting member is provided between adjacent ones of said plurality of second electrode portions.

9. A ferroelectric liquid crystal device according to claim 7, wherein an area where each of said first electrode portion and said corresponds second electrode portion intersect with each other in three dimensions is rectangular in shape, and said inversion preventing member is provided on one side along a first dimension of said rectangular shape, positioned on the side where said inversion of spontaneous polarization of the ferroelectric liquid crystal molecule tends to occur, and on two sides along a second dimension of said rectangular shape, being positioned on both sides thereof.

10. A ferroelectric liquid crystal device according to claim 9, wherein said inversion preventing member is provided on one side, along a lengthwise dimension of said plurality of first electrode portions on the main surface of said plurality of first electrode portions, and said inversion preventing member is provided on two opposing sides, along a lengthwise dimension of said second electrode portions, on the main surface of said plurality of second electrode portions.

11. A ferroelectric liquid crystal device according to claim 7, wherein an area where each said first electrode portion and each said corresponding second electrode portion intersect with each other in three dimensions is rectangular in shape, and said inversion preventing member is provided on two opposing sides along a first dimension of said rectangular and on two opposing sides along a second dimension of said rectangle.

12. A ferroelectric liquid crystal device according to claim 11, wherein said inversion preventing member is provided on one and another side, along a lengthwise dimension of said first electrode portion, on the main surface of said first electrode portion, and said inversion preventing member is provided on one and another side along a lengthwise dimension of said second electrode portion on the main surface of said second electrode portion.

13. A ferroelectric liquid crystal device having ferroelectric liquid crystals sealed between first and second plates arranged opposing each other to form a space, comprising:

a second electrode portion arranged on a surface of said second plate, facing said first plate;

a plurality of first electrode portions arranged, spaced apart from each other, on a surface of said first plate facing said second plate; and an inversion preventing member provided on an outside edge of an area where said plurality of first electrode portions and said second electrode portion overlap with each other on the main surface of one of said first and second electrode portion, for preventing undesired inversion of spontaneous polarization of molecules of said ferroelectric liquid crystals;

said inversion preventing member being formed on a side of said outside edge where said inversion of the spontaneous polarization tends to occur.

14. A ferroelectric liquid crystal device according to claim 13, wherein said second electrode portion comprises a plurality of second electrode portions arranged so as to be spaced apart from each other on the main surface of said second plate;

said plurality of second electrode portions and said plurality of first electrode portions intersect with each other in three dimensions;

an area of said intersection being rectangular in shape;

said inversion preventing member is provided on one side along a first dimension of said rectangular shape, positioned on the side where said inversion of the spontaneous polarization of the ferroelectric liquid crystal molecules tends to occur, and on two sides along a second dimension of said rectangular shape, being positioned on both sides thereof.

15. A ferroelectric liquid crystal device according to claim 14, wherein said inversion preventing member is provided on one side, along a lengthwise dimension of said plurality of firs electrode portions, on the main surface of said plurality of first electrode portions, and said inversion preventing member is provided on one and another side, along a lengthwise dimension of said plurality of second electrode portions on the main surface of said plurality of second electrode portions.

16. A ferroelectric liquid crystal device according to claim 13, wherein said second electrode portion comprises a plurality of second electrode portions arranged so as to be spaced apart from each other on the main surface of said second plate, said plurality of second electrode portions and said plurality of first electrode portions intersect with each other in three dimensions, an area of said intersection being rectangular in shape, and said inversion preventing member is provided on two opposing sides along a first dimension of said rectangle and on two opposing sides along a second dimension of said rectangle.

17. A ferroelectric liquid crystal device according to claim 16, wherein said inversion preventing member is provided on two opposing sides, along a lengthwise dimension of the first electrode portion on the main surface of said first electrode portion; and said inversion preventing member is provided on one and another side, along a lengthwise dimension of said second electrode portion on the main surface of said second electrode portion.

18. A method of manufacturing a ferroelectric liquid crystal device, including a layer with ferroelectric liquid crystals, comprising the steps of:

forming a plurality of first electrode portions arranged so as to be spaced apart from each other on a surface of said first plate;

forming an inversion preventing member for preventing undesired inversion of spontaneous polarization of molecules of said ferroelectric liquid crystals on one side of each of said plurality of first electrode portions along a lengthwise dimension, on the main surface of said first electrode portion;

forming a plurality of second electrode portions spaced apart from each other on a surface of a second plate;

forming said inversion preventing member on two opposing sides, along a lengthwise dimension of said plurality of second electrode portions on a main surface of said second electrode portion; and arranging said first plate and said second plate opposed to each other such that a space is formed therebetween and said plurality of first electrode portions and said plurality of second electrode portions intersect with each other in three dimensions;

said inversion preventing formed on the main surface of said first electrode portion being provided on a side where said inversion of the spontaneous polarization tends to occur; and sealing said ferroelectric liquid crystals in said space.

* * * * *